United States Patent [19]
Kullstam et al.

[11] Patent Number: 6,075,408
[45] Date of Patent: Jun. 13, 2000

[54] OQPSK PHASE AND TIMING DETECTION

[75] Inventors: Johan Kullstam, Marlboro, Mass.; Rahul Deshpande, Cardiff by the Sea, Calif.

[73] Assignee: International Business Machines Corp., Armonk, N.Y.

[21] Appl. No.: 09/223,688

[22] Filed: Dec. 30, 1998

[51] Int. Cl.[7] ............................. H03D 3/00; H03K 9/10; H04L 27/22; H04L 27/227

[52] U.S. Cl. ................. 329/304; 329/307; 329/310; 375/324; 375/329

[58] Field of Search ........................ 329/304–310; 375/324, 329–333

[56] References Cited

U.S. PATENT DOCUMENTS 5,945,875  8/1999  Zhou et al. ............................ 329/304

*Primary Examiner*—David Mis
*Attorney, Agent, or Firm*—Blakely, Sokoloff, Taylor & Zafman LLP

[57] ABSTRACT

A method and an apparatus for generating an error estimate as input for an error recovery loop of a demodulator which receives an offset quadrature phase shift keyed (OQPSK) signal having a symbol interval. The method comprises the following operations: (a) receiving at least four consecutive complex samples $z_{-½}$, $z_0$, $z_{1/2}$ and $z_1$ obtained by sampling the OQPSK signal at half the symbol interval; and (b) computing the error estimate based on the complex samples $z_{-1/2}$, $z_0$, $z_{1/2}$ and $z_1$.

32 Claims, 16 Drawing Sheets

OQPSK PHASE AND TIMING DETECTION

BACKGROUND OF THE INVENTION

1. Field of the Invention

The present invention relates generally to demodulation of offset quadrature phase shift keyed (OQPSK) signals, also known as staggered quadrature phase shift keyed (SQPSK) signals, and more particularly, to a unified phase and timing detection method and apparatus which facilitate both acquisition and tracking of OQPSK signals.

2. Description of Related Art

Phase shift keying (PSK) describes the modulation technique which uses the input signal to modulate the phase of the carrier. PSK offers a simple way of increasing the number of information symbols in the transmission without increasing the bandwidth.

In the quadrature phase shift keying (QPSK), the carrier phase is modulated to have four possible values, corresponding to the transmitted information symbols 00, 01, 10, 11.

A baseband signal can be expressed as a complex signal having a real part and an imaginary part. The real part is called the in-phase component, the imaginary part is called the quadrature component. In quadrature modulation such as QPSK, two orthogonal carriers $\cos \omega_c t$ and $-\sin \omega_c t$ are modulated with two independent half-speed data signals which correspond to the in-phase and quadrature components of a baseband signal, respectively, and these modulated carriers are added to form a composite signal to be transmitted. The two carriers have the same frequency but are 90° apart in phase, and define a two-dimensional signal space. The axes in this space are represented by the carriers $\cos \omega_c t$ and $-\sin \omega_c t$. The coordinates are represented by the in-phase and quadrature components of the baseband signal. This representation forms a signal constellation.

Three important properties are desirable for data transmission by radio. These are finite bandwidth, zero intersymbol interference (ISI) and constant carrier envelope. All of these properties cannot be achieved absolutely in the same system. Thus, there must be some acceptable compromise with respect to at least one of the properties.

With QPSK, finite bandwidth and zero ISI can be achieved. However, the variation in the carrier envelope of the transmitted signal can be unacceptable. This is caused by the fact that the in-phase and quadrature components can be zero at the same time. If the two component signals are normalized so that the sum of the powers of the two sampled signals is unity, then the continuous sum, which corresponds to the power of the modulated carrier, can vary between a maximum of 1 and a minimum of zero.

However, if the timing of the two component signals is staggered by half the symbol period (or interval), then the two component signals can no longer be zero at the same time. If the two component signals are normalized, then, at sampling times, when one signal is $\pm 1/\sqrt{2}$, the other is either 0 or $\pm 1/\sqrt{2}$. Therefore, the power of the modulated carrier can vary between a maximum of 1 and a minimum of 0.5. This is equivalent to 3 dB of amplitude modulation, which is acceptable for most applications. This modulation technique where the in-phase and quadrature components of the QPSK signal are staggered by half the symbol interval is called offset quadrature phase shift keying (OQPSK), or staggered quadrature phase shift keying (SQPSK). Although an OQPSK signal provides better data transmission properties than a QPSK signal, the OQPSK signal is difficult to acquire and track at the receiver. In other words, it is difficult to recover the baseband timing and the carrier phase of the OQPSK signal.

The prior art approach is to destagger the received in-phase and quadrature components by half a symbol interval and to use standard QPSK approaches to time and phase alignment on the destaggered signals. This approach works well in tracking, since the correct component can be effectively destaggered. However, the destaggering approach does not work well for acquisition of the OQPSK signal for the following reason. Since the phase of the carrier is unknown, one of the in-phase and quadrature channels in the demodulator is blindly delayed. Since the symbols are not yet in phase alignment, this delaying causes severe mixing of nearby symbols and phases. Thus, the acquisition performance of this prior art technique is poor.

Therefore, there is currently a need for a method for efficiently tracking and acquiring an OQPSK signal.

SUMMARY OF THE INVENTION

The present invention is a method and an apparatus for generating an error estimate as input for an error recovery loop of a demodulator which receives an offset quadrature phase shift keyed (OQPSK) signal having a symbol interval. The method comprises the following operations: (a) receiving at least four consecutive complex samples $z_{-1/2}$, $z_0$, $z_{1/2}$ and $z_1$; obtained by sampling the OQPSK signal at half the symbol interval; and (b) computing the error estimate based on the complex samples $z_{-1/2}$, $z_0$, $z_{1/2}$ and $z_1$.

The disclosed method allows concurrent generation of phase and timing error estimates, and therefore, concurrent baseband timing and carrier phase recovery.

When the method is used for recovering the carrier phase of the OQPSK signal, i.e., for generating a phase error estimate for the phase recovery loop of the demodulator, operation (b) of the method comprises the operations of equating a first error value $E_0$ to the imaginary part of $z_0$ and a second error value $E_1$ to the real part of $z_{1/2}$, inverting $E_0$ if the real part of $z_0$ is strictly positive, inverting $E_1$ if the imaginary part of $z_{1/2}$ is strictly negative, equating $E_0$ to zero if the imaginary part of $z_{-1/2}$ and the imaginary part of $z_{1/2}$ have a same sign, equating $E_1$ to zero if the real part of $z_0$ and the real part of $z_1$ have a same sign, and combining $E_0$ and $E_1$ to produce a phase error estimate. The method produces one phase error estimate per modulation symbol.

For recovering the baseband timing of the OQPSK signal, i.e., for generating a timing error estimate for the timing recovery loop of a demodulator, the method comprises the same operations as for recovering the carrier phase above, except for the following differences in the inversion criteria: inverting $E_0$ if the imaginary part of $z_{1/2}$ is strictly negative and inverting $E_1$ if the real part of $z_1$ is strictly negative. The method produces one timing error estimate per modulation symbol.

The method can be implemented such that the imaginary parts of $z_{-1/2}$ and $z_{-1/2}$ correspond to peak samples, the real parts of $z_{-1/2}$ and $z_{-1/2}$ correspond to transition samples, the imaginary parts of $z_0$ and $z_1$ correspond to transition samples, and the real parts of $z_0$ and $z_1$ correspond to peak samples. The peak samples are obtained by sampling the OQPSK signal on time, the transition samples are obtained by sampling the OQPSK signal half the symbol interval off in timing.

However, the disclosed method is applicable and effective even when $z_{-1/2}$, $z_0$, $z_{1/2}$ and $z_1$ do not correspond to the specific pattern of peak samples and transition samples stated above.

In the preferred embodiment, the method further comprises the operation of truncating each of the first and second error values $E_0$ and $E_1$ to a predetermined number of bits and the operation of saturating each of the phase and timing error estimates such that each of the phase and timing error estimates fits in a predetermined range of values.

DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

Figure 1:
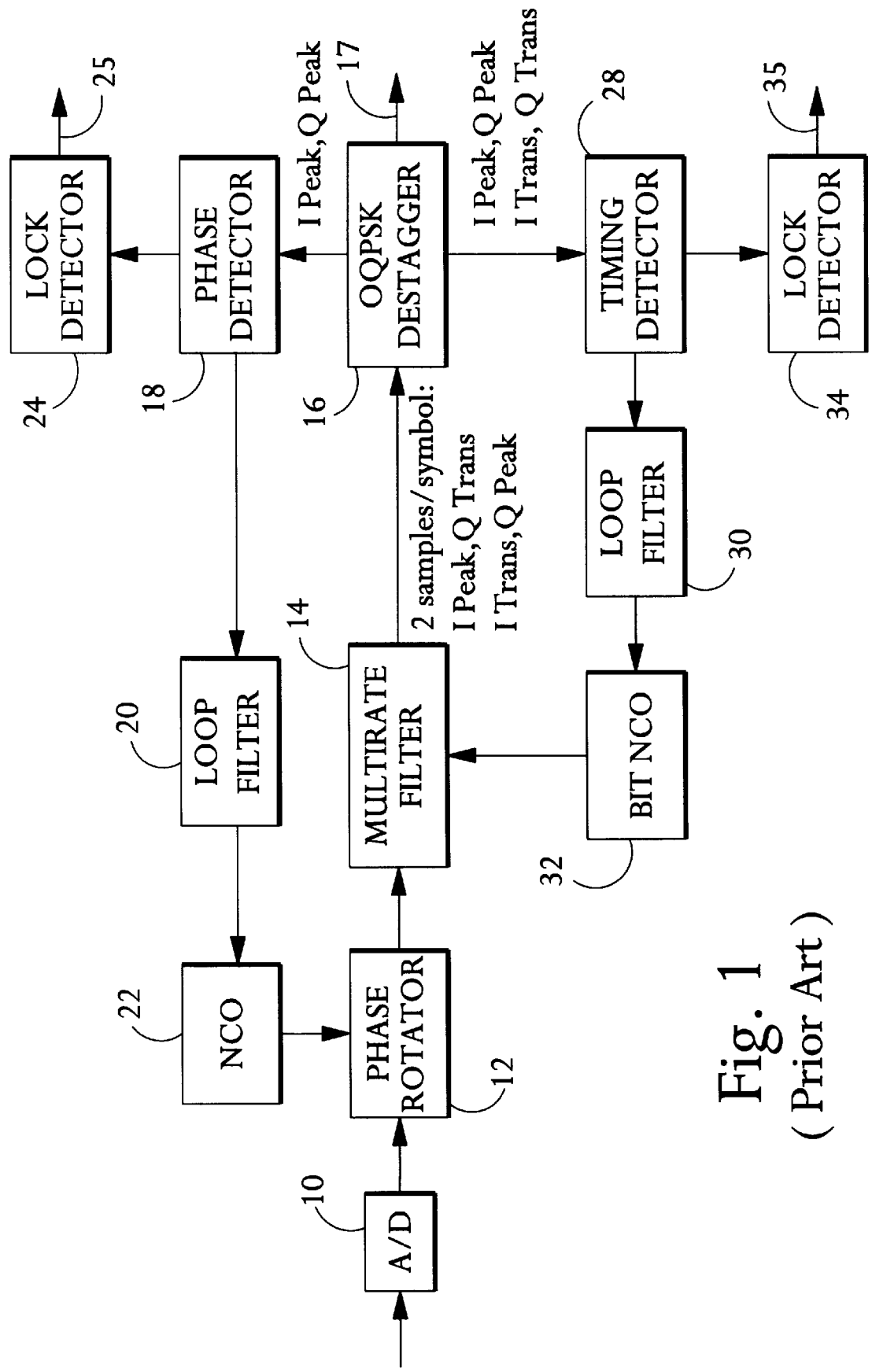
FIG. 1 is a block diagram of a prior art digital system for OQPSK carrier recovery and symbol synchronization.

FIG. 1 is a block diagram of a traditional digital system for OQPSK carrier recovery and symbol synchronization.

Referring to the prior art system of FIG. 1, an analog OQPSK signal is sampled at a fixed rate by an analog-to-digital converter 10. A phase rotator 12 processes the resulting digital OQPSK signal to produce the in-phase (I) and the quadrature (Q) components of the OQPSK signal. A multirate filter 14, also called interpolation filter or resampling filter, receives the I and Q signals and produces two complex samples per symbol, namely, {I Peak, Q Trans} and (I Trans, Q Peak}, where Trans denotes transition. A peak sample of either the I or the Q signals is obtained by integrating the signal over the symbol interval which is synchronized to bit boundaries. A transition sample is obtained by integrating the signal over a time span equal to the symbol interval, starting at an offset equal to half the symbol interval from the start bit boundary of a peak sample. Thus, a transition sample occurs between two peak samples.

The outputs of the multirate filter 14 are then destaggered by an OQPSK destagger circuit 16 to yield an output 17 which ideally should correspond to the I and Q components of the original QPSK signal, which was staggered and sent as the OQPSK signal by the transmitter. The destaggering is done by delaying the I component by half a symbol interval. Two feedback loops from the OQPSK destagger are classical digitally implemented phase locked loops, which facilitate carrier recovery and symbol synchronization.

The first phase locked loop, which performs carrier phase estimation, includes a phase detector 18, a loop filter 20 and a numerically controlled oscillator (NCO) 22. The phase detector 18 measures the phase error and passes it to the lowpass loop filter 20 which filters out undesired components then passes the phase error to the NCO 22. The NCO 22 uses this phase error to keep the phase rotator 12 synchronized with the carrier signal. A lock detector 24 is coupled to the phase detector 18 to generate an output 25 indicating when phase lock is achieved, thus allowing a user to determine the validity of the output 17.

The second phase locked loop, which performs symbol timing estimation, includes a timing detector 28, a loop filter 30 and a numerically controlled oscillator (NCO) 32. The timing detector 28 measures the timing error and passes it to the lowpass loop filter 30 which removes undesired high frequency components from it. The output of the loop filter 30 then drives the NCO 32. The output of the NCO 32 is a clock signal which controls the sampling times for the input to the multirate filter 30. A lock detector 34 is coupled to the timing detector 28 to generate an output 35 indicating when timing lock is achieved, thus allowing a user to determine the validity of the output 17.

Referring to FIG. 1, the phase error and the timing error are computed by the phase detector 18 and the timing detector 28, respectively, according to the following equations:

$$\text{Phase Error} = \text{Arctan}(Q\text{ Peak}/I\text{ Peak}) - \pi/4 \quad (1)$$
$$\text{Timing Error} = I\text{ Trans}[1/2] \cdot \text{sgn}\{\text{sgn}(I\text{ Peak}[1]) - \text{sgn}(I\text{ Peak}[0])\} + Q\text{ Trans}[1/2] \cdot \text{sgn}\{\text{sgn}(Q\text{ Peak}[1]) - \text{sgn}(Q\text{ Peak}[0])\} \quad (2)$$

where sgn denotes the signum function, and where the Trans samples occur between the samples Peak[0] and Peak[1], with Peak[0] preceding Peak[1]. The phase detector is usually implemented with a look-up table, or by estimating the value of the sine function of the phase error and by using the approximation $\sin \phi \approx \phi$ for small $\phi$.

The above prior art approach works well for signals for which carrier phase and symbol timing can be easily recovered, such as QPSK signals. For this reason, it is the standard approach used for acquiring QPSK signals.

However, the above prior art approach does not work well for OQPSK signals, for which carrier phase and symbol timing cannot be easily recovered for the following reason. During acquisition of an OQPSK signal, there is heavy cross talk interference from adjacent symbols. This interference causes the I and Q channels to rotate as viewed from the constellation diagram. This rotation in turn impedes the symbol timing recovery. Furthermore, since there is no timing lock when the I and Q channels are rotating, it is not possible to determine which samples are peak samples and which samples are transition samples. Thus, carrier phase recovery is also affected.

The present invention mitigates the above adverse effects caused by heavy cross talk interference of adjacent symbols in an OQPSK signal. The present invention is a phase/timing detector which uses the raw un-destaggered waveform to compute the timing and phase error.

Figure 2:
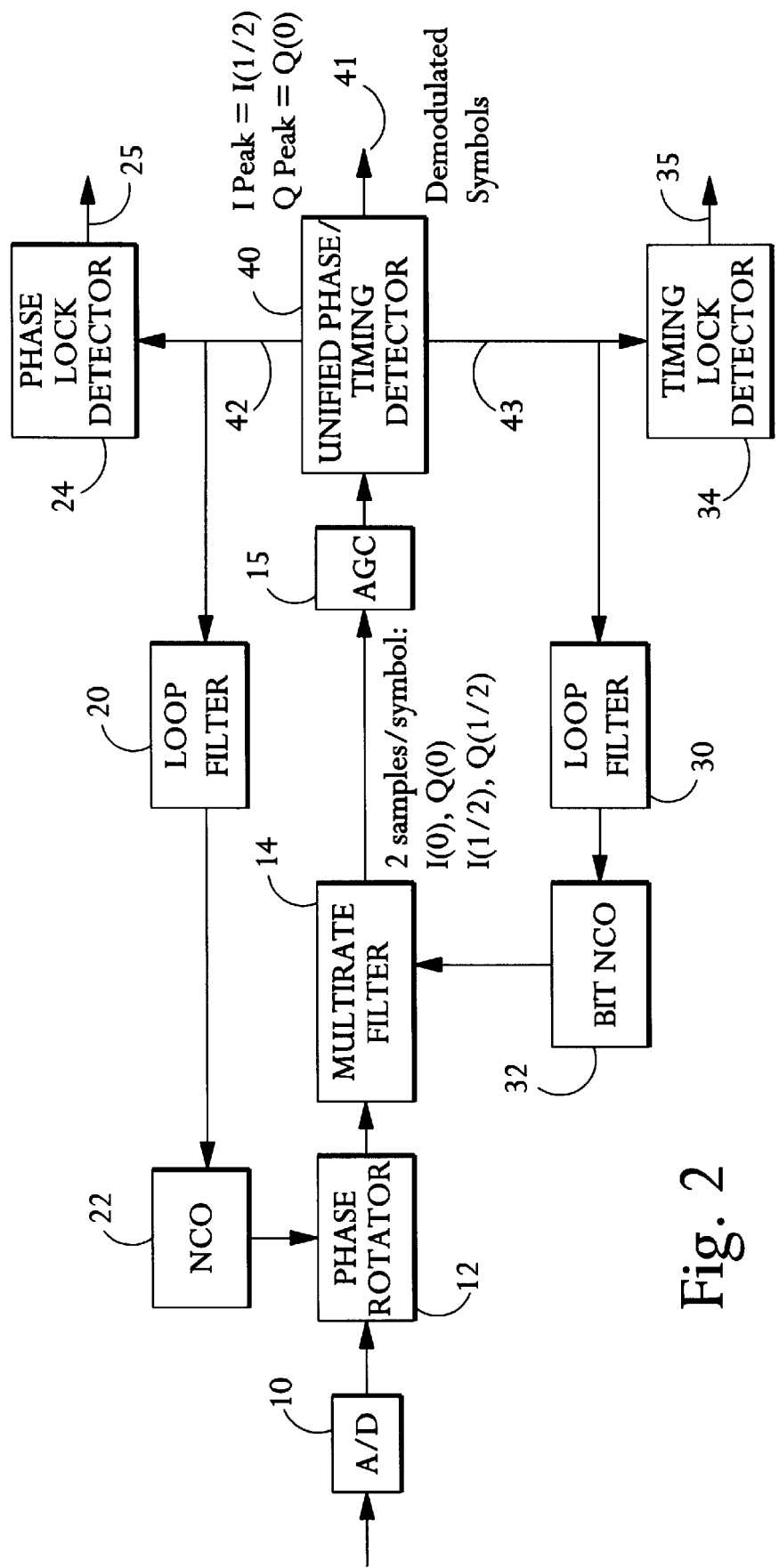
FIG. 2 is a block diagram illustrating the digital system of the present invention for OQPSK carrier recovery and symbol synchronization.

A system that incorporates the phase/timing detector of the present invention is as illustrated in FIG. 2.

Referring to FIG. 2, the analog OQPSK signal is sampled at a fixed rate by an analog-to-digital converter 10. The phase rotator 12 processes the resulting digital OQPSK signal to produce the in-phase (I) and the quadrature (Q) components of the OQPSK signal. The multirate filter 14, also called interpolation filter or resampling filter, receives the I and Q signals and produces two complex samples per symbol, namely, $\{I[0],Q[0]\}$ and $\{I[\frac{1}{2}],Q[\frac{1}{2}]\}$, where the indices of the I and Q samples correspond to time instants. Thus, the I and Q signals are effectively sampled at half the symbol interval.

An optional automatic gain control (AGC) circuit 15 can be included in the system of FIG. 2. The function of the AGC is to keep the total power in the AGC bandwidth constant, to avoid saturation as well as other design problems.

The outputs of the multirate filter 14, or of the optional AGC 15 if it is included in the system, are then used by a unified phase/timing detector 40 to produce the demodulated symbols I Peak=I[½] and Q Peak=Q[0] at an output 41.

The unified phase/timing detector 40, the loop filter 20 and the numerically controlled oscillator (NCO) 22 form the digitally implemented phase locked loop which performs carrier phase estimation.

The phase/timing detector 40 measures the phase error and passes it to the lowpass loop filter 20 which filters out undesired components then passes the phase error to the NCO 22. The NCO 22 uses this phase error to keep the phase rotator 12 synchronized with the carrier signal. The lock detector 24 is coupled to the phase/timing detector 40 to generate an output 25 indicating when phase lock is achieved, thus allowing a user to determine the validity of the output 41.

The unified phase/timing detector 40, the loop filter 30 and the NCO 32 form the digitally implemented phase locked loop which performs symbol timing estimation.

The phase/timing detector 40 measures the timing error and passes it to the lowpass loop filter 30 which removes undesired high frequency components from it. The output of the loop filter 30 then drives the NCO 32. The output of the NCO 32 is a clock signal which controls the sampling times for the input to the multirate filter 30. The lock detector 34 is coupled to the phase/timing detector 40 to generate an output 35 indicating when timing lock is achieved, thus allowing a user to determine the validity of the output 41.

Referring to FIG. 2, the phase error and the timing error are computed by the phase/timing detector 40 according to the following equations:

$$\text{Phase Error} = I[1/2] \cdot \text{sgn}(Q[1/2]) \cdot \{\text{sgn}(I[1]) - \text{sgn}(I[0])\} + \quad (3)$$
$$Q[0] \cdot \text{sgn}(I[0]) \cdot \{\text{sgn}(Q[1/2]) - \text{sgn}(Q[-1/2])\}$$

$$\text{Timing Error} = I[1/2] \cdot \text{sgn}(I[1]) \cdot \{\text{sgn}(I[1]) - \text{sgn}(I[0])\} + \quad (4)$$
$$Q[0] \cdot \text{sgn}(Q[1/2]) \cdot \{\text{sgn}(Q[1/2]) - \text{sgn}(Q[-1/2])\}$$

The indices of the I and Q samples correspond to time instants. FIG. 2 shows the snapshot where the samples at time instants [0] and [½] are inputted to the phase/timing detector 40. Prior to that snapshot, the preceding inputs were samples obtained at time instants [−1] and [−½]. However, from the perspective of the phase/timing detector 40, all it sees is a sequence of samples coming in with indices [n+0] and [n+(½)], where n is an integer.

The system of FIG. 2 avoids the complex distortion the signal undergoes during destaggering with incorrect phase. The phase/timing detector 40 uses the full complex information of both peak and transition samples which are both un-destaggered.

The following discussion describes the phase and timing error estimation schemes and the principles underlying Equations (3) and (4).

The standard way of demodulating an OQPSK signal involves delaying the real, i.e., in-phase, component of the signal by an offset equal to half the symbol interval. When there is phase lock, the result is identical to the one obtained with a QPSK signal.

Figure 3A:
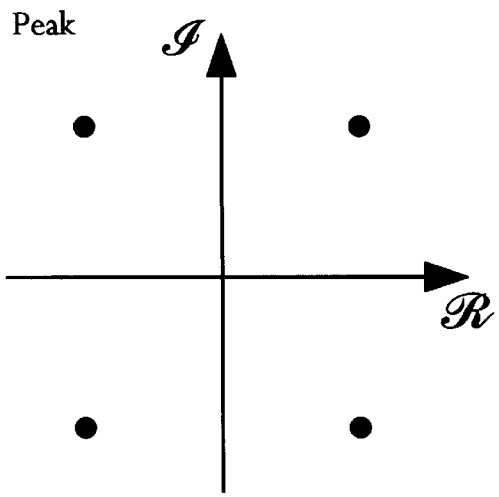
FIGS. 3A and 3B illustrates the set of OQPSK constellations obtained after signal destaggering, when phase lock is already achieved for the OQPSK signal.
Figure 3B:
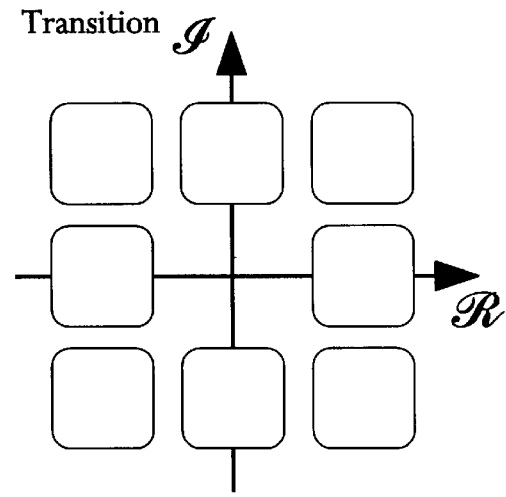

FIGS. 3A and 3B show the set of OQPSK constellations obtained after signal destaggering, when phase lock is already achieved for the OQPSK signal. In FIG. 3A, marked Peak, each of the symbols is sampled on-time and the bit decisions can be easily read off by determining the quadrant the symbol is in. In FIG. 3B, marked Transition, the OQPSK constellation is sampled at exactly half a symbol interval off in timing. This results in eight patches depending on which two symbols straddle the transition. The eight patches are rather spread out because of the tails of the surrounding symbol filters. If phase lock is not yet achieved for the OQPSK signal, the delaying of the real part, performed by the OQPSK destagger 16 in the system of FIG. 1, would cause the peak and transition parts to mix and yield a distorted constellation. During acquisition, the orientation of the signal constellation is unknown in both phase and timing. Therefore, the phase and timing detectors 18, 28 of the system of FIG. 1 will perform sub-optimally. Simulation results show that the sub-optimal detectors 18, 28 cause the system to have poor acquisition performance. Specifically, performance of the system of FIG. 1 will not conform to MIL-STD-188-165 acquisition time specifications at lower bit rates.

If the OQPSK signal is not destaggered in order to align in timing the in-phase component with the quadrature component, a different set of OQPSK constellations is obtained. This set of raw undestaggered OQPSK constellations is as shown in FIGS. 4A and 4B.

Figure 4A:
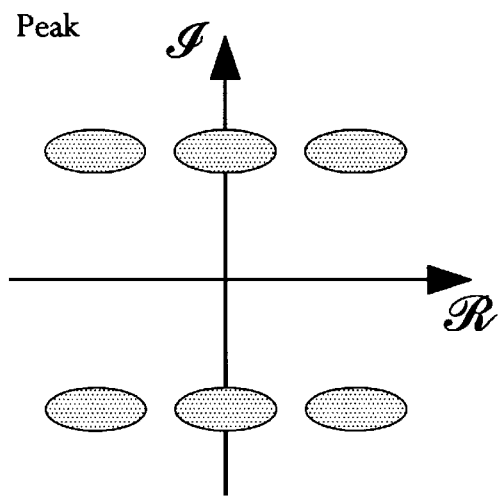
FIGS. 4A and 4B illustrate the set of raw un-destaggered OQPSK constellations.
Figure 4B:
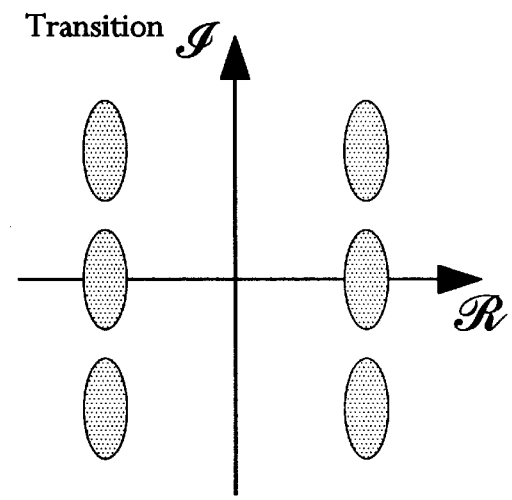

In FIG. 4A, marked Peak, the imaginary part, i.e., quadrature component, is on-time while the real part, i.e., in-phase component, is off in timing by half a symbol interval. In FIG. 4B, marked Transition, the real part is on time while the imaginary part is off in timing by half a symbol interval. If the OQPSK signal is in phase lock, delaying the real part in timing by half a symbol interval will transform the raw undestaggered OQPSK constellations depicted in FIGS. 4A and 4B to the destaggered OQPSK constellations shown in FIGS. 3A and 3B, respectively.

In the present invention, phase and timing acquisition and tracking are performed on a raw undestaggered OQPSK constellation in order to avoid the complex distortion the signal would undergo during destaggering with incorrect phase.

For the following discussion on the derivation of Equations (3) and (4), different raw undestaggered OQPSK constellations are considered.

Figure 5:
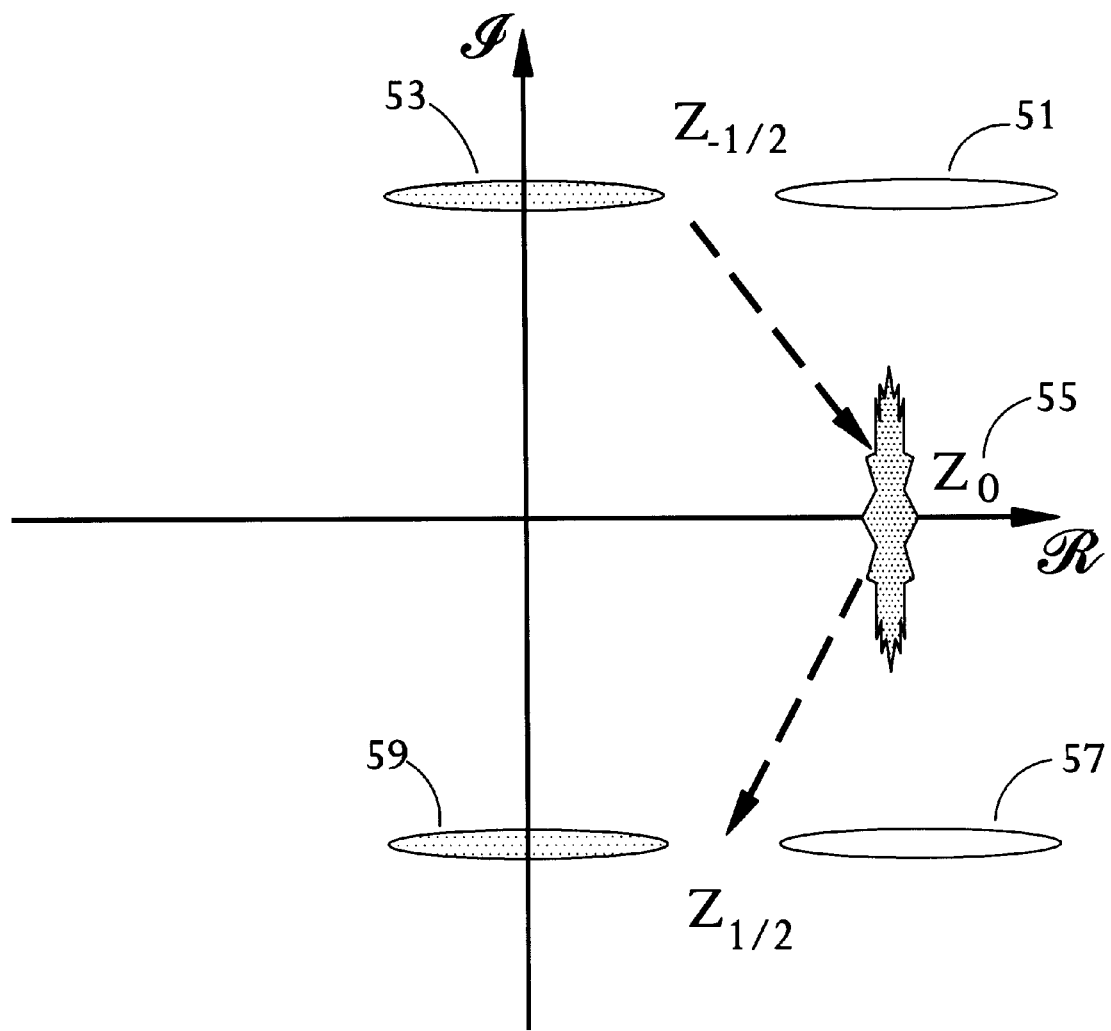
FIG. 5 illustrates the raw undestaggered OQPSK constellation which corresponds to the bit sequence $Q(-\frac{1}{2})=1$, $I(0)=1$, $Q(\frac{1}{2})=0$ at three time instants $t_{-\frac{1}{2}}$, $t_0$, $t_{1/2}$, where bit 1 is represented by a positive voltage and bit 0 is represented by a negative voltage.

FIG. 5 shows the raw undestaggered OQPSK constellation which corresponds to the bit sequence Q(-½)=1, I(0)=1, Q(½)=0 at three time instants $t_{-½}$, $t_0$, $t_{1/2}$ where bit 1 is represented by a positive voltage and bit 0 is represented by a negative voltage. The middle symbol $z_0$ is from an {I Peak, Q Trans} sample. The surrounding symbols $z_{31\ ½}$ and $z_{1/2}$ are from {I Trans, Q Peak} samples. The subscripts of the symbols correspond to the time instants. At time instant $t_0$, the in-phase component I is equal to bit 0 while the quadrature component Q is making the transition from bit 1 to bit 0. This is represented by the symbol $z_0$ at location 55. At each of the time instants $t_{-½}$ and $t_{1/2}$, the value of the in-phase component I is uncertain and can be one of two possible values. These possible values are due intersymbol interference from adjacent symbols corresponding to the in-phase bits that respectively precede and succeed the bit I(0). The symbols $z_{-½}$ and $z_{1/2}$ are denoted by a pair of ellipses each to indicate the possible locations of the symbols. The ellipse 51 represents the location of $z_{-½}$ for Q(-½)=1 and I(-½)=1. The ellipse 53 represents the location of $z_{-½}$ for Q(-½)=1 and I(-½)=transition from bit 0 to bit 1. The ellipse 57 represents the location of $z_{1/2}$ for Q(½)=0 and I(½)=1. The ellipse 59 represents the location of $z_{1/2}$ for Q(½)=0 and I(½)=transition from bit 1 to bit 0.

Figure 8:
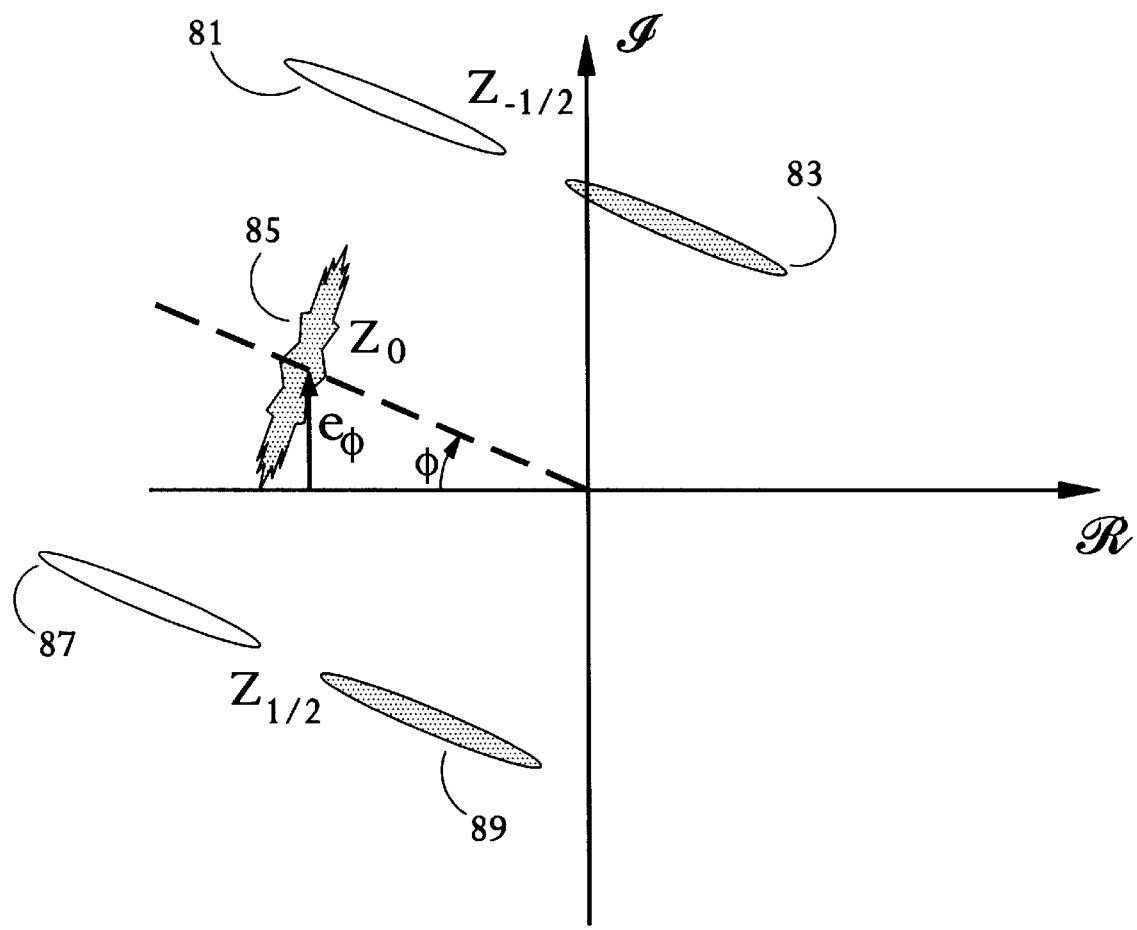
FIG. 8 illustrates the effect of a phase error $\phi$ on the OQPSK constellation which corresponds to the bit sequence $Q(-\frac{1}{2})=1$, $I(0)=0$, $Q(\frac{1}{2})=0$.

The raw undestaggered OQPSK constellation corresponding to the bit sequence Q(-½)=1, I(0)=0, Q(½)=0 is obtained by flipping the constellation of FIG. 5 from right to left with respect to the imaginary axis. The effect of a phase error on such a constellation is illustrated in FIG. 8.

Figure 6:
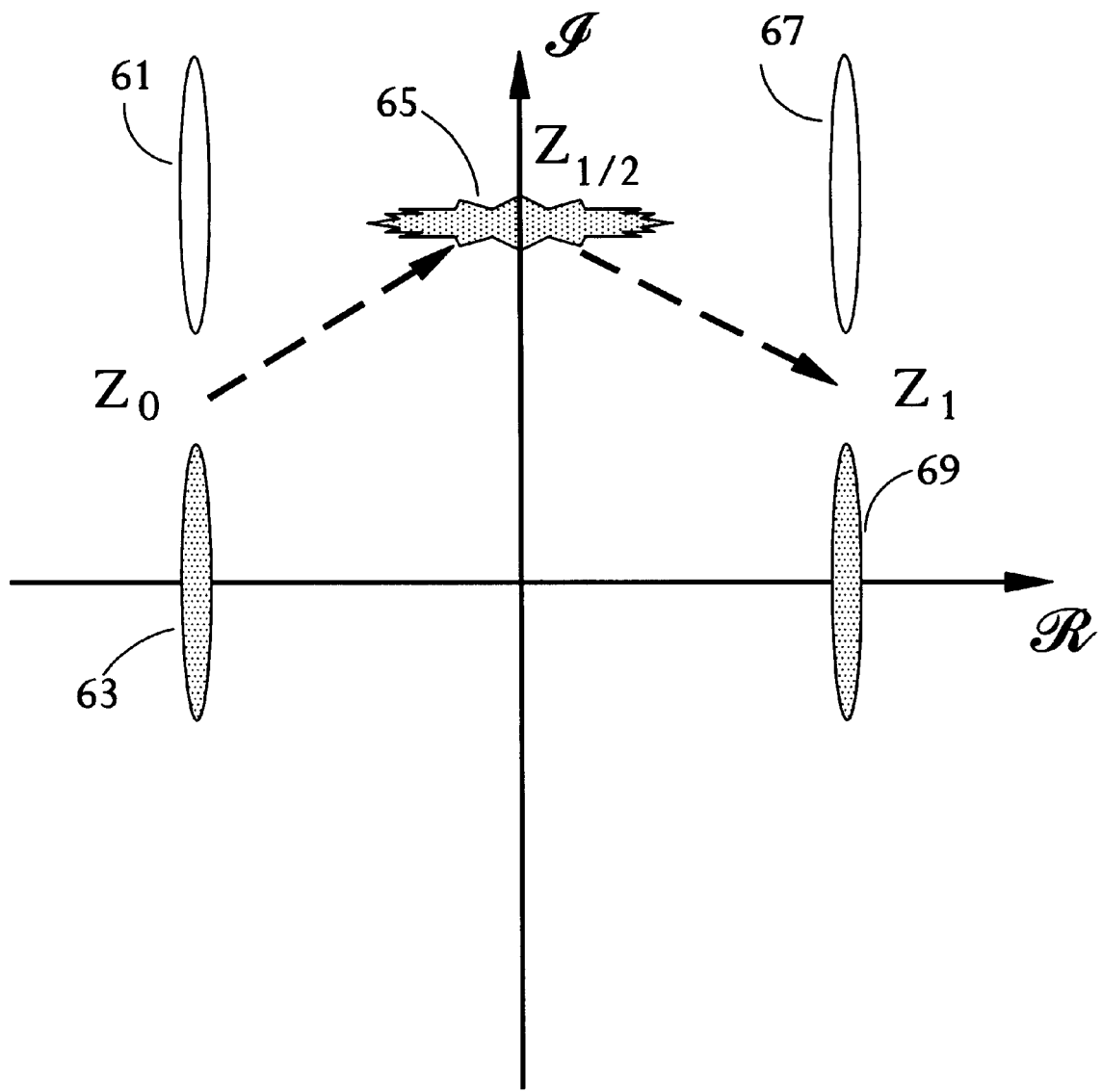
FIG. 6 illustrates the raw undestaggered OQPSK constellation which corresponds to the bit sequence $I(0)=0$, $Q(\frac{1}{2})=1$, $(1)=1$ at three time instants $t_0$, $t_{1/2}$, $t_1$.

FIG. 6 shows the raw undestaggered OQPSK constellation which corresponds to the bit sequence I(0)=0, Q(½)=1, I(1)=1 at three time instants $t_0$, $t_{1/2}$, $t_1$ where bit 1 is represented by a positive voltage and bit 0 is represented by a negative voltage. The middle symbol $z_{1/2}$ is from an {I Trans, Q Peak} sample. The surrounding symbols $z_0$ and $z_1$ are from {I Peak, Q Trans} samples. The subscripts of the symbols correspond to the time instants. At time instant $t_{1/2}$, the in-phase component I is making the transition from bit 0 to bit 1, while the quadrature component Q is equal to bit 1. This is represented by the symbol $z_{1/2}$ at location 65. At each of the time instants $t_0$ and $t_1$, the value of the quadrature component Q is uncertain and can be one of two possible values. These possible values are due intersymbol interference from adjacent symbols corresponding to the two quadrature component bits that respectively precedes and succeeds the bit Q(½). The symbols $z_0$ and $z_1$ are denoted by a pair of ellipses each to indicate the possible locations of the symbols. The ellipse 61 represents the location of $z_0$ for I(0)=0 and Q(0)=1. The ellipse 63 represents the location of $z_0$ for I(0)=0 and Q(0)=transition from bit 0 to bit 1. The ellipse 67 represents the location of $z_1$ for I(1)=1 and Q(1)=1. The ellipse 69 represents the location of $z_1$ for I(1)=1 and Q(1)=transition from bit 1 to bit 0.

Figure 10:
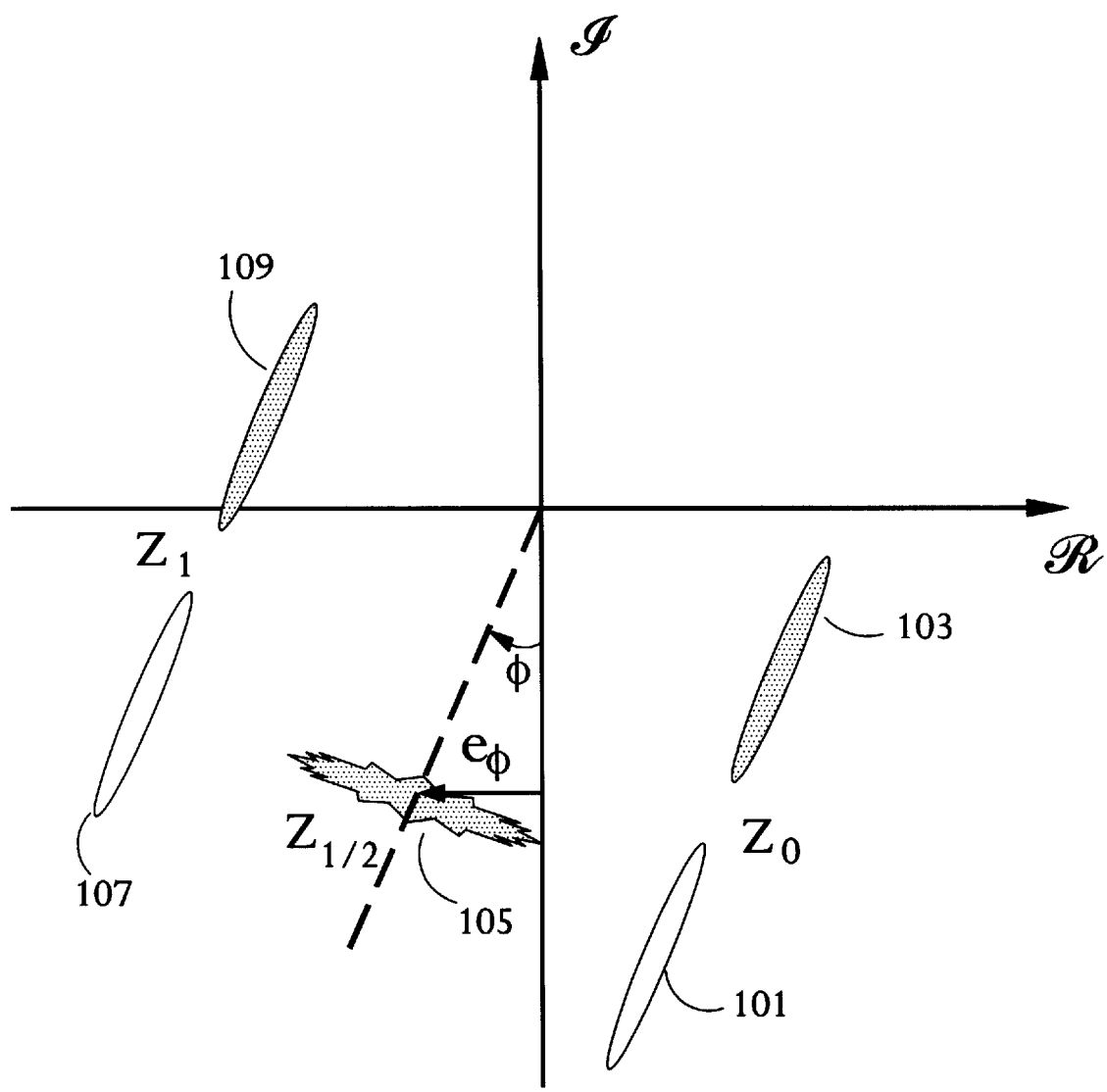
FIG. 10 illustrates the effect of a phase error on the raw undestaggered OQPSK constellation corresponding to the bit sequence $I(0)=0$, $Q(\frac{1}{2})=0$, $I(1)=1$ at three time instants $t_0$, $t_{1/2}$, $t_1$.

The raw undestaggered OQPSK constellation corresponding to the bit sequence I(0)=0, Q(½)=0, I(1)=1 can be obtained by flipping the constellation of FIG. 5 from top to bottom with respect to the real axis R. The effect of a phase error on such a constellation is illustrated in FIG. 10.

Figure 7:
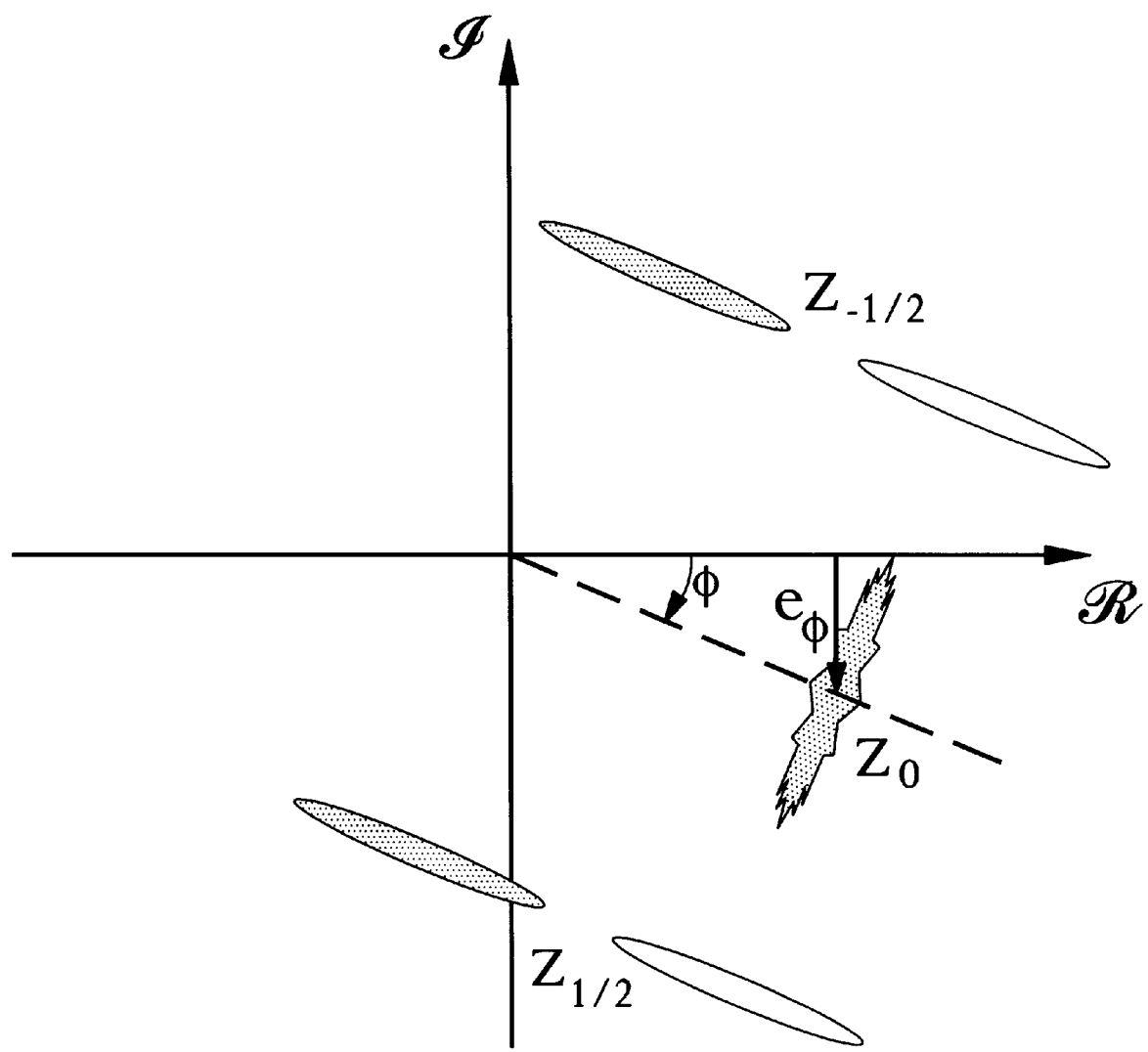
FIG. 7 illustrates the effect of a phase error $\phi$ on the OQPSK constellation of FIG. 5 which corresponds to the bit sequence $Q(-\frac{1}{2})=1$, $I(0)=1$, $Q(\frac{1}{2})=0$.

FIG. 7 illustrates the effect of a phase error $\phi$ on the OQPSK constellation of FIG. 5 which corresponds to the bit sequence Q(-½)=1, I(0) =1, Q(½)=0. As shown in FIG. 7, the variable $e_\phi$ is closely related to the phase error $\phi$. If $e_\phi$ is driven to zero then the phase error $\phi$ is also driven to zero. Therefore, $e_\phi$ can be used as a surrogate for the phase error $\phi$, and the phase loop of the system of FIG. 2 can have $e_\phi$ as input instead of the phase error $\phi$. For the exemplary constellation of FIG. 7, $e_\phi$ is equal to $\Im\{z_0\}$, the imaginary part of the sample $z_0$.

For the bit sequence Q(-½)=1, I(0)=0, Q(½)=0, the effect of a phase error $\phi$ is as illustrated in FIG. 8. Referring to FIG. 8, the ellipse 81 represents the location of $z_{-½}$ for Q(-½)=1 and I(-½)=0. The ellipse 83 represents the location of $z_{1/2}$ for Q(-½)=0 and I(-½)=transition from bit 1 to bit 0. The ellipse 85 represents the location of $z_0$ for I(0)=0 and Q(0)=transition from bit 1 to bit 0. The ellipse 87 represents the location of $z_{1/2}$ for Q(½)=0 and I(½)=0. The ellipse 89 represents the location of $z_{1/2}$ for Q(½)=1 and 1(½)= transition from bit 0 to bit 1. For the exemplary constellation of FIG. 8, $e_\phi$ is equal to $-\Im\{z_0\}$, the imaginary part of the sample $z_0$ with a changed sign.

Therefore, as illustrated in FIGS. 7 and 8, the phase error surrogate $e_\phi$ which affects a transition symbol $z_k$ located on the real axis of the constellation is:

$$e_\phi(k) = -\Im\{z_k\} \cdot \text{sgn}\Re\{z_k\} \qquad (5)$$

$$\text{for } \Im\left\{z_{k-\frac{1}{2}}\right\} \cdot \Im\left\{z_{k+\frac{1}{2}}\right\} < 0 \text{ and } k \in Z$$

where $\Im$ denotes the imaginary part, R denotes the real part, and Z denotes the set of signed integers.

Figure 9:
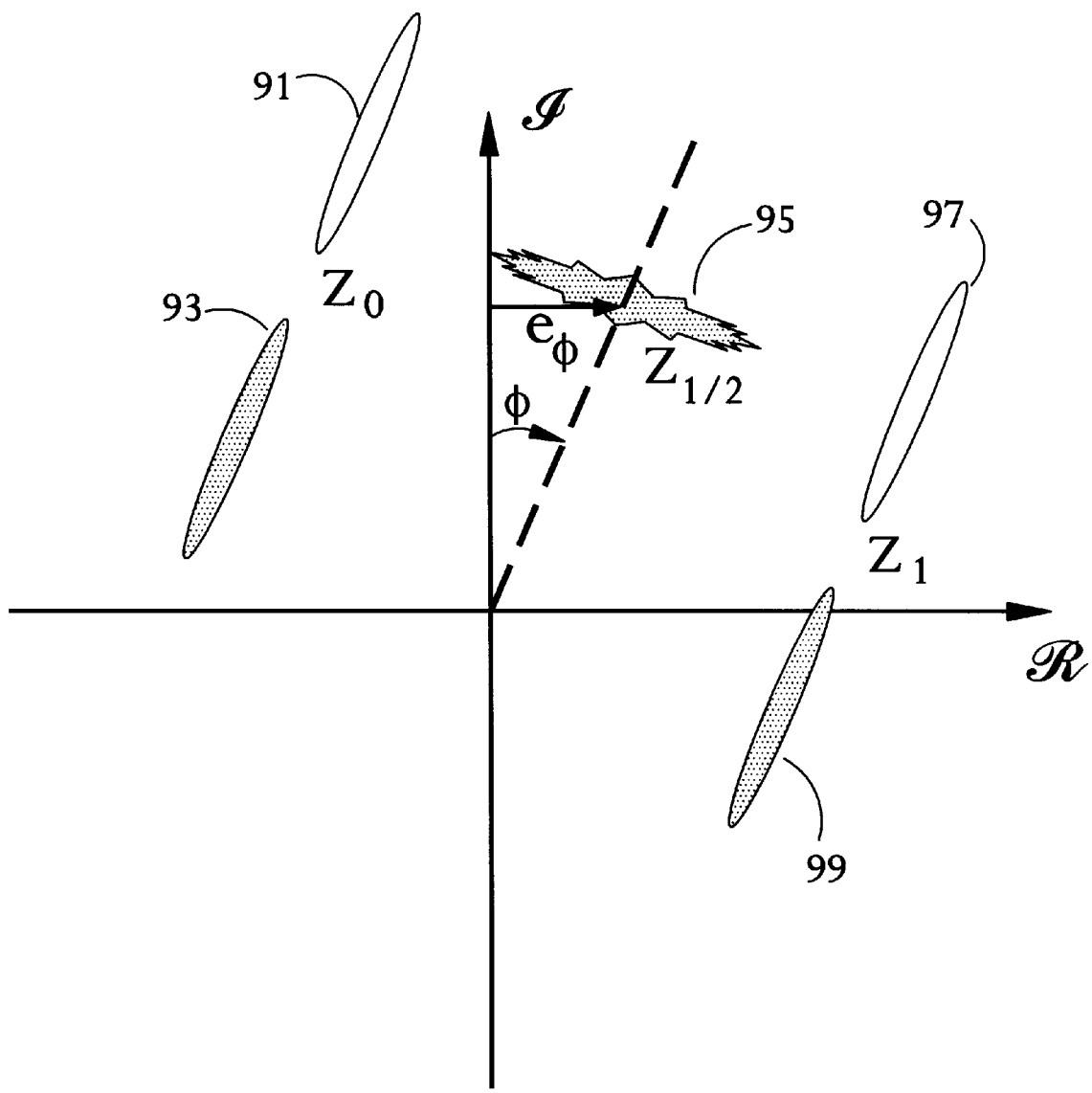
FIG. 9 illustrates the raw undestaggered OQPSK constellation which corresponds to the bit sequence $I(0)=1$, $Q(\frac{1}{2})=1$, $I(1)=0$ at three time instants $t_0$, $t_{1/2}$, $t_1$.

FIGS. 9 and 10 illustrate the effect of a phase error on a transition symbol located on the imaginary axis of an OQPSK constellation.

FIG. 9 shows a raw undestaggered OQPSK constellation which corresponds to the bit sequence I(0)=1, Q(½)=1, I(1)=0 at three time instants $t_0$, $t_{1/2}$, $t_0$ where bit 1 is represented by a positive voltage and bit 0 is represented by a negative voltage. The middle symbol $z_{1/2}$ is from an {I Trans, Q Peak} sample. The surrounding symbols $z_0$ and $z_1$ are from {I Peak, Q Trans} samples. The subscripts of the symbols correspond to the time instants. At time instant $t_{1/2}$, the in-phase component I is making the transition from bit 0 to bit 1, while the quadrature component Q is equal to bit 1. This is represented by the symbol $z_{1/2}$ at location 65. At each of the time instants $t_0$ and $t_1$, the value of the quadrature component Q is uncertain and can be one of two possible values. These possible values are due intersymbol interference from adjacent symbols corresponding to the two quadrature component bits that respectively precedes and succeeds the bit Q(½). The symbols $z_0$ and $z_1$ are denoted by a pair of ellipses each to indicate the possible locations of the symbols. The ellipse 91 represents the location of $z_0$ for I(0)=0 and Q(0)=1. The ellipse 93 represents the location of $z_0$ for I(0)=0 and Q(0)=transition from bit 0 to bit 1. The ellipse 97 represents the location of $z_1$ for I(1)=1 and Q(1)=1. The ellipse 99 represents the location of $z_1$ for I(1)=1 and Q(1)=transition from bit 1 to bit 0. For the exemplary constellation of FIG. 9, $e_{100}$ is equal to $\Re\{z_{1/2}\}$, the real part of the sample $z_{1/2}$.

FIG. 10 shows a raw undestaggered OQPSK constellation which corresponds to the bit sequence I(0)=1, Q(½)=0, I(1)=0 at three time instants $t_0$, $t_{1/2}$, $t_1$ where bit 1 is represented by a positive voltage and bit 0 is represented by a negative voltage. The middle symbol $z_{1/2}$ is from an {I Trans, Q Peak} sample. The surrounding symbols $z_0$ and $z_1$ are from {I Peak, Q Trans} samples. The subscripts of the symbols correspond to the time instants. At time instant $t_{1/2}$, the in-phase component I is making the transition from bit 1 to bit 0, while the quadrature component Q is equal to bit 0. This is represented by the symbol $z_{1/2}$ at location 105. At each of the time instants $t_0$ and $t_1$, the value of the quadrature component Q is uncertain and can be one of two possible values. These possible values are due intersymbol interference from adjacent symbols corresponding to the two quadrature component bits that respectively precedes and succeeds the bit Q(½). The symbols $z_0$ and $z_1$ are denoted by a pair of ellipses each to indicate the possible locations of the symbols. The ellipse 101 represents the location of $z_0$ for I(0)=1 and Q(0)=0. The ellipse 103 represents the location of $z_0$ for I(0)=1 and Q(0)=transition from bit 1 to bit 0. The ellipse 107 represents the location of $z_1$ for I(1)=0 and Q(1)=0. The ellipse 109 represents the location of $z_1$ for I(1)=0 and Q(1)=transition from bit 0 to bit 1. For the exemplary constellation of FIG. 10, $e_\phi$ is equal to $-\Re\{z_{1/2}\}$, the real part of the sample $z_{1/2}$ with a minus sign.

Therefore, as illustrated in FIGS. 9 and 10, the phase error surrogate $e_\phi$ which affects a transition symbol $z_k$ located on the imaginary axis of the constellation is:

$$e_\phi\left(k + \frac{1}{2}\right) = \Re\left\{z_{k+\frac{1}{2}}\right\} \cdot \mathrm{sgn}\Im\left\{z_{k+\frac{1}{2}}\right\} \quad (6)$$

$$\text{for } \Re\{z_k\} \cdot \Re\{z_{k+1}\} < 0 \text{ and } k \in Z$$

At all other times, i.e., when there is no transition symbol resulting from a transition in either the in-phase or quadrature component, the phase error surrogate is defined to be zero.

The two phase error estimates obtained by Equations (5) and (6), which correspond to different locations of the error-affected transition symbols, are added together to cover all phase error situations. This yields one phase error estimate per modulation symbol. Equation (2) is equivalent to the combination of Equations (5) and (6), with a scale factor of 2 which can be easily eliminated with an appropriate gain of the loop filter 20. Thus, the result obtained by Equation (3) is equivalent to the resulting phase error estimate and is the output of the phase/timing detector 40 to the loop filter 20 and the phase lock detector 24 of the system of FIG. 2.

The derivation of the equations for the timing error is similar to the above derivation of the equations for the phase error.

Figure 11:
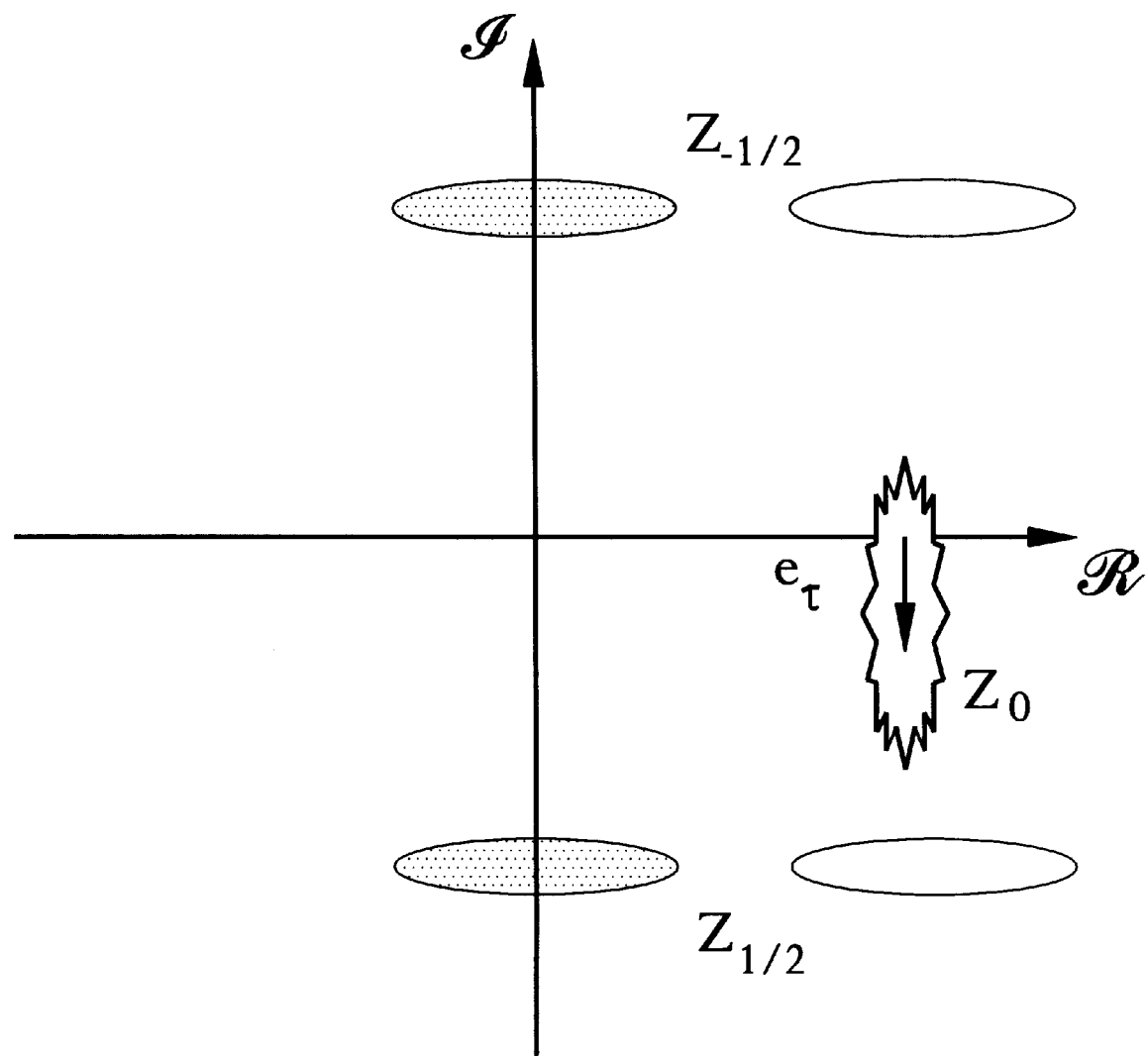
FIG. 11 illustrates the effect of a timing error on the OQPSK constellation of FIG. 5.

FIG. 11 shows the effect of a timing error on the OQPSK constellation of FIG. 5. When the signal is early or late, the impulse responses of the surrounding symbols, which are typically raised cosine shaped responses, do not cancel at the symbol in question. Depending on the direction of the transition, this causes the middle point to move up or down across the real axis, or left or right across the imaginary axis.

Figure 12:
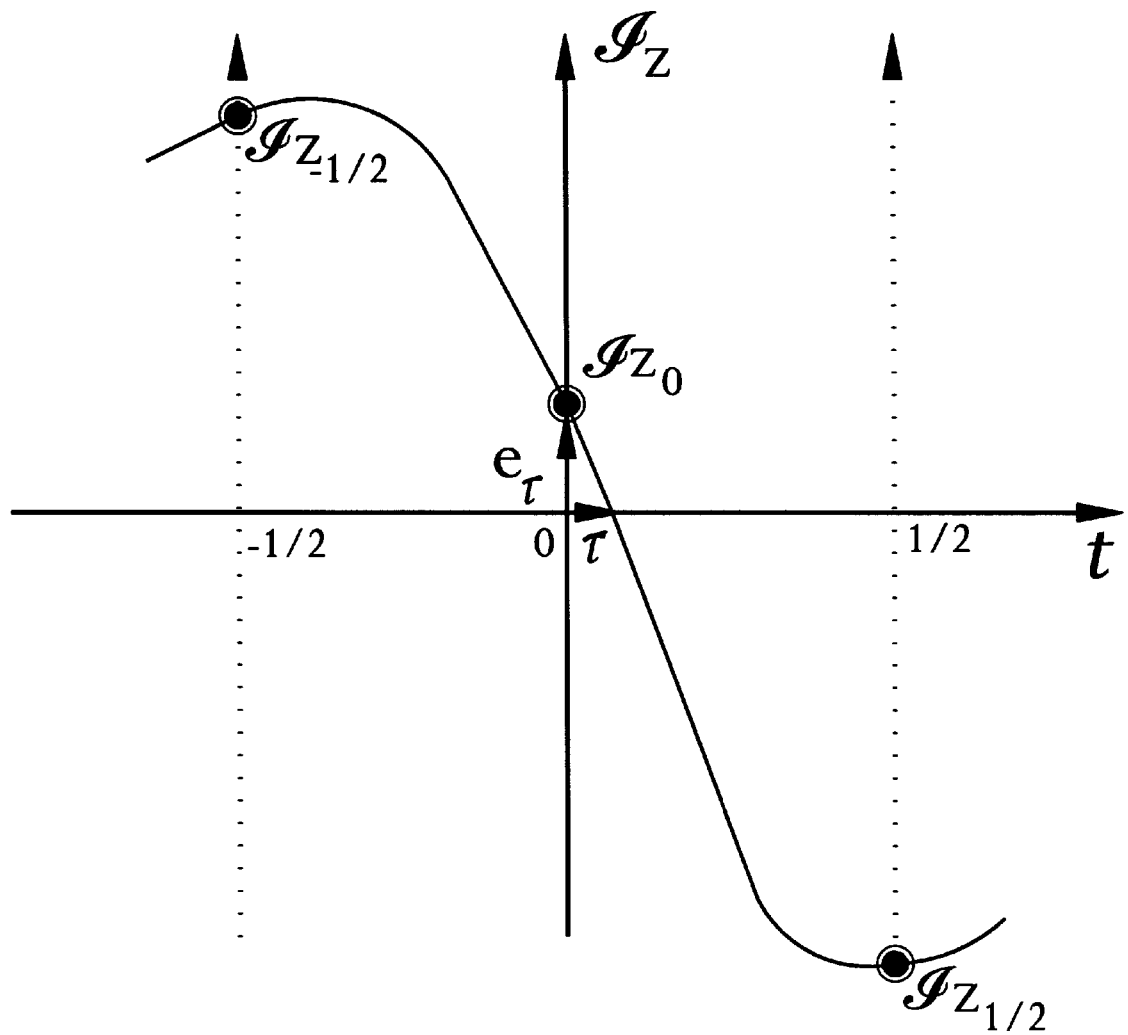
FIG. 12 illustrates the timing error estimate as a function of the imaginary part of the sample $z_0$ of the OQPSK constellation of FIG. 11.

For the constellation in FIG. 11, the transition is in the imaginary part and is illustrated in FIG. 12. As shown in FIG. 12, the variable $e_\tau$ is closely related to the timing error $\tau$. if $e_\tau$ is driven to zero then the timing error $\tau$ is also driven to zero. Therefore, $e_\tau$ can be used as a surrogate for the timing error $\tau$, and the timing loop of the system of FIG. 2 can have $e_\tau$ as input instead of the timing error $\tau$. For the exemplary constellation of FIG. 11, $$e_\tau = -\Im\{z_0\} \cdot \mathrm{sgn}\Im\{z_{1/2}\}.$$

For the constellation in FIG. 6, a transition due to timing error will be in the real part, and $$e_\tau(k) = -\Im\{z_k\} \cdot \mathrm{sgn}\Im\left\{z_{k+\frac{1}{2}}\right\} \quad (7)$$

$$\text{for } \Im\left\{z_{k-\frac{1}{2}}\right\} \cdot \Im\left\{z_{k+\frac{1}{2}}\right\} < 0 \text{ and } k \in Z, E$$

$$e_\tau\left(k + \frac{1}{2}\right) = \Re\left\{z_{k+\frac{1}{2}}\right\} \cdot \mathrm{sgn}\Re\{z_{k+1}\} \quad (8)$$

$$\text{for } \Re\{z_k\} \cdot \Re\{z_{k+1}\} < 0 \text{ and } k \in Z.$$

Therefore, the timing error surrogate can be computed according to the following equations:

$$e_\tau = \Re\{z_{1/2}\} \cdot \mathrm{sgn}\,\Re\{z_1\}.$$

At all other times, i.e., when there is no transition symbol resulting from a transition in either the in-phase or quadrature component, the timing error surrogate is defined to be zero.

The two timing error estimates obtained by Equations (7) and (8), which correspond to different locations of the error-affected transition symbols, are added together to cover all timing error situations. This yields one timing error estimate per modulation symbol. Equation (4) is equivalent to the combination of Equations (7) and (8), with a scale factor of 2 which can be easily eliminated with an appropriate gain of the loop filter 30. Thus, the result obtained by Equation (4) is equivalent to the resulting timing error estimate and is the output of the phase/timing detector 40 to the loop filter 30 and the timing lock detector 34 of the system of FIG. 2.

The equations (5), (6), (7), (8) show that the phase and timing error surrogates are both derived from the same sources $\Re\{z_k\}$, $\Re\{z_{k+½}\}$, $\Im\{z_k\}$ and $\Im\{z_{k+½}\}$. The sign of the phase error surrogate is determined by the current symbol, while the sign of the timing error surrogate is determined by the next symbol.

The phase and timing error surrogates are interrelated since they are derived from the same sources. Thus, the phase loop is driven by the true phase error plus the timing error with a random sign in addition to noise and decision errors. Similarly, the timing loop is driven by the timing error plus the phase error with a random sign. The mixing of the two signals, i.e., phase and timing, is undesirable, but it is inherent in the OQPSK modulation. However, performance is not greatly affected by this mixing. The cross term adds only about 3 dB of noise to each of the phase and timing loops which can be easily filtered out by a narrow loop filter.

Since the phase and timing errors for OQPSK signals are interrelated, it is important that the phase and timing recovery loops be coordinated to drive the demodulator to a stable point where both phase and timing locks are achieved.

Figure 13:
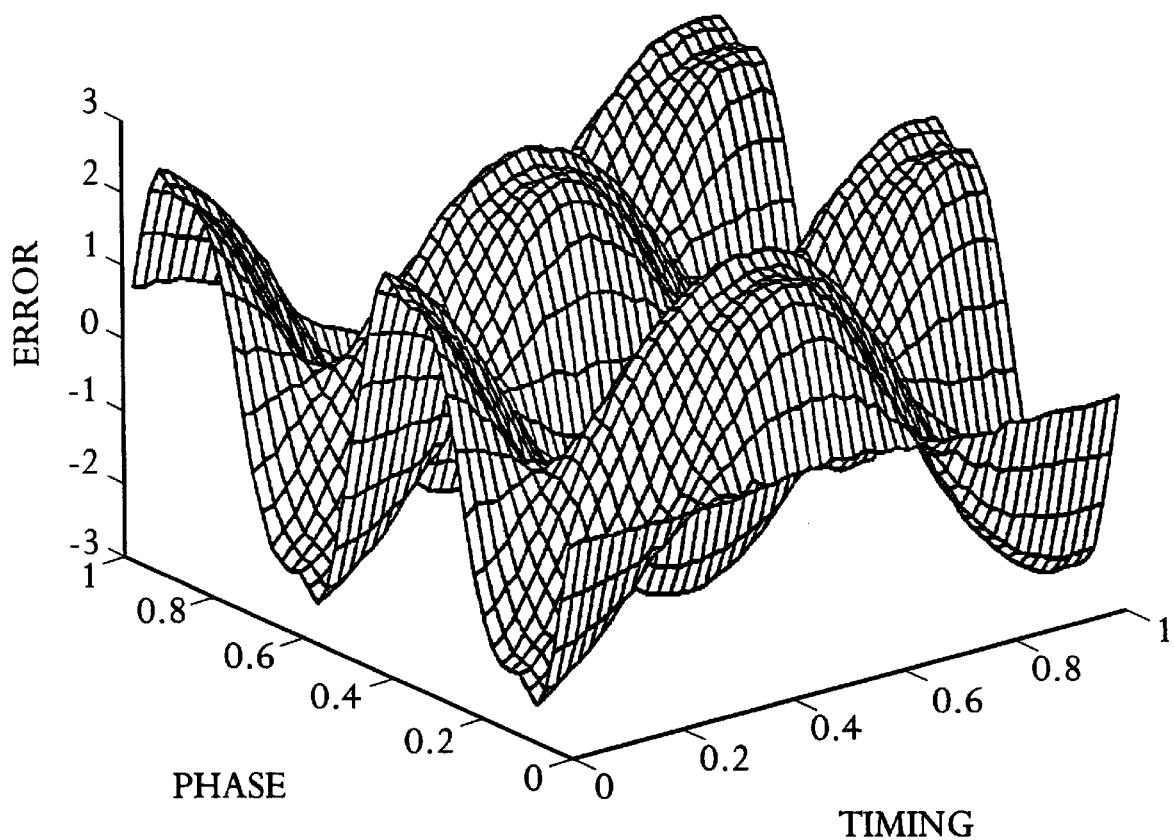
FIG. 13 is a three-dimensional graph of the phase error estimate as a function of carrier phase and baseband timing.
Figure 14:
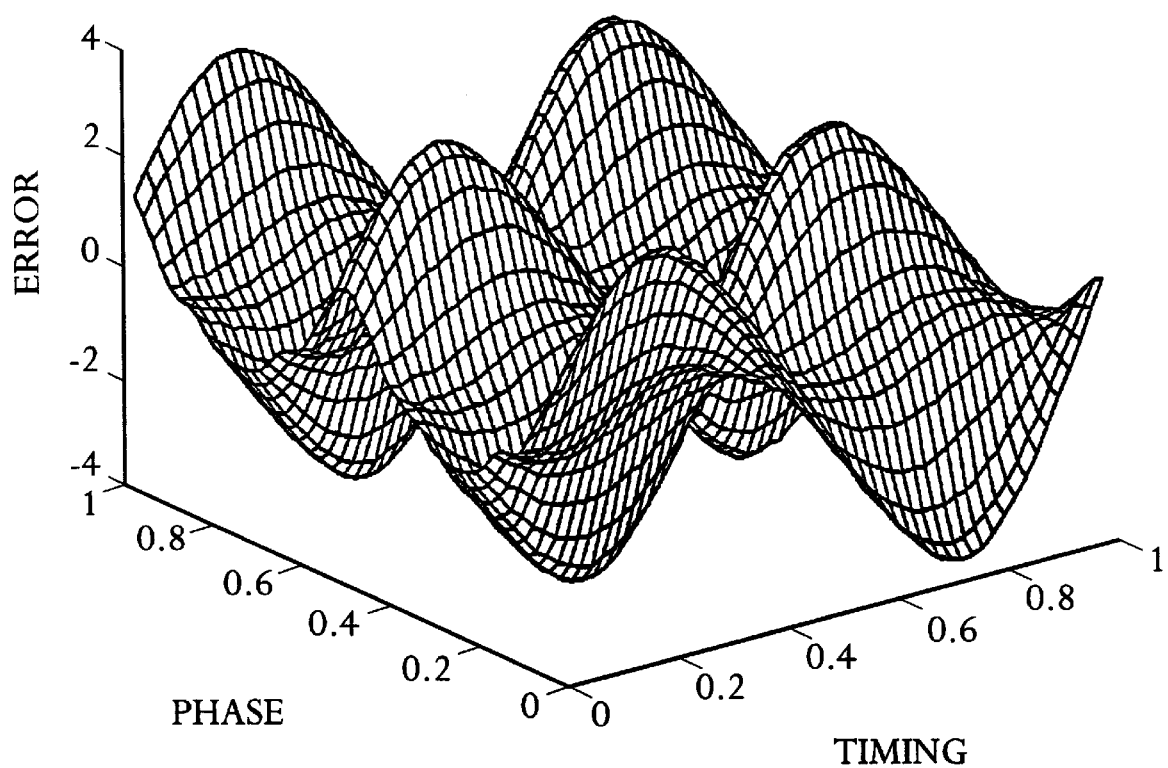
FIG. 14 is a three-dimensional graph of the timing error estimate as a function of carrier phase and baseband timing.

Since the OQPSK detector does not separate the timing and phase information, the phase and timing errors depend on both phase and timing offsets. FIGS. 13 and 14 show this dependence.

FIG. 13 shows the mean phase error as a function of phase and timing. The vertical axis is the output 42 of the phase/timing detector 40 of the system of FIG. 2. Phase is expressed in revolutions (360 degrees) and timing is expressed in modulation symbol intervals. FIG. 13 shows that the phase error has two periods: {¼ phase revolution and ½ symbol interval} and {−¼ phase revolution and ½ symbol interval}.

FIG. 14 shows the timing error as a function of phase and timing. The vertical axis is the error signal at the output 43 of the phase/timing detector 40. The unit of the phase axis is 360-degree revolution and the unit of the timing axis is modulation symbol interval.

Figure 15:
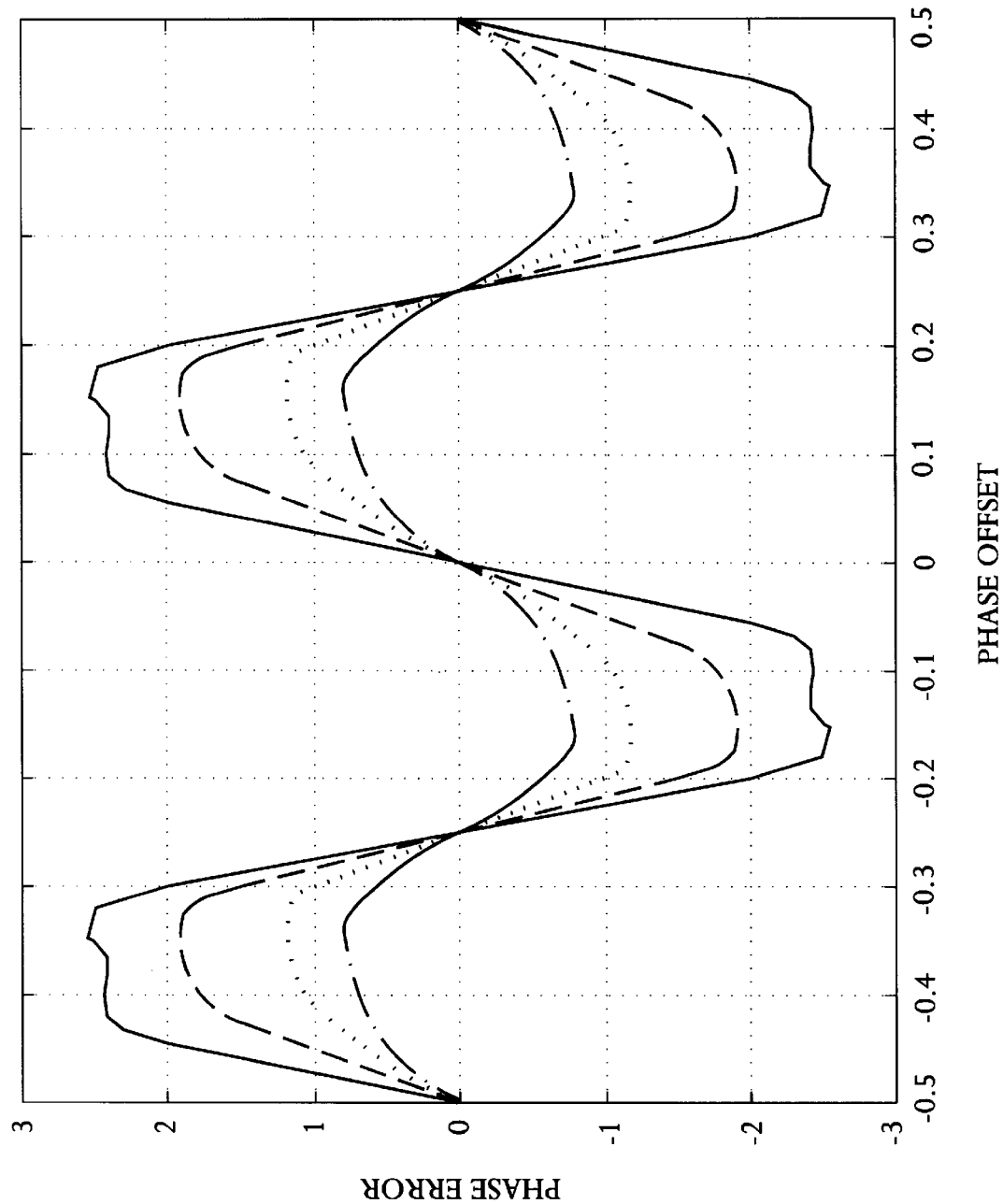
FIG. 15 is a graph of the phase error estimate as a function of the carrier phase when the baseband timing is held at an optimal point.
Figure 16:
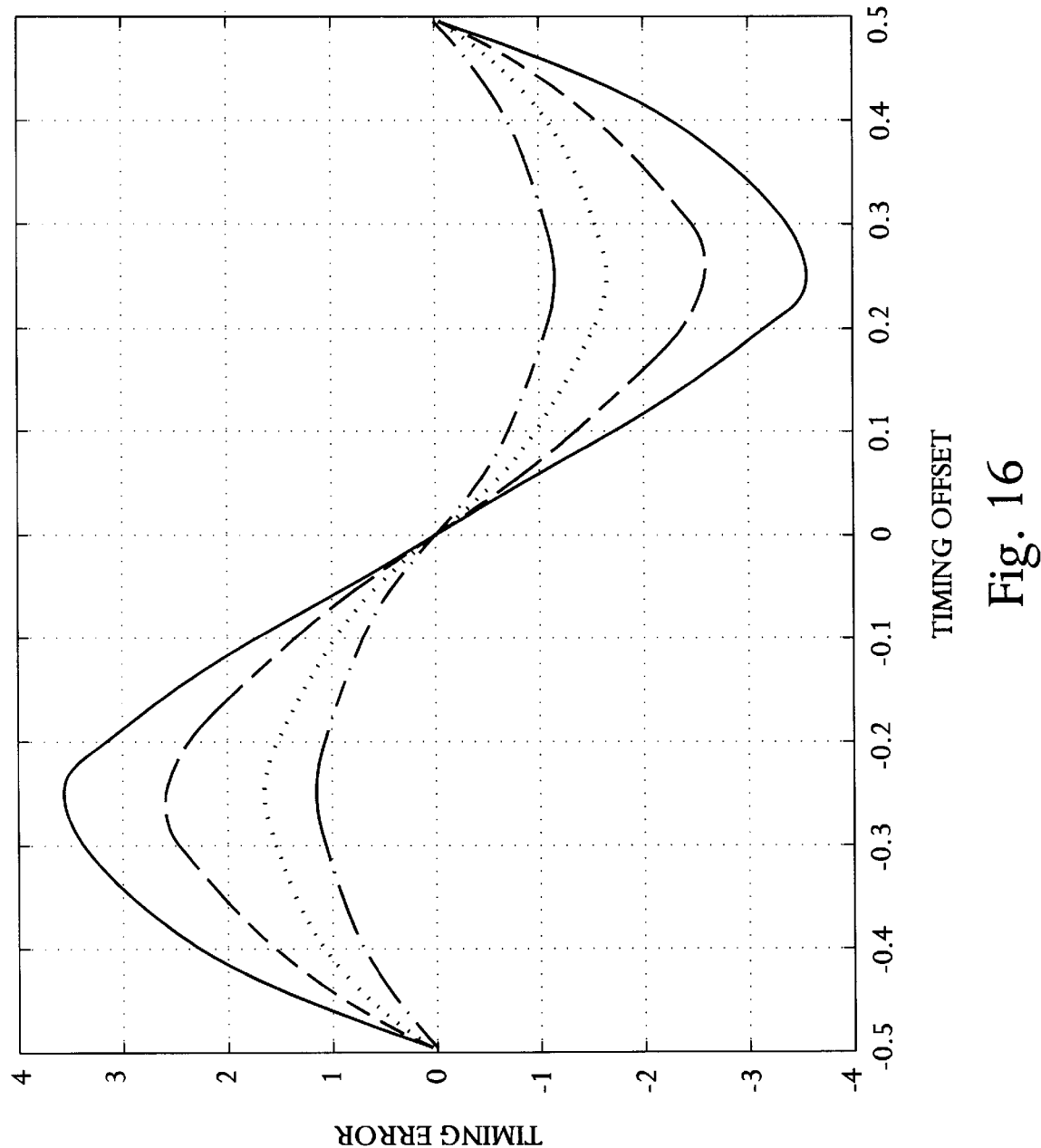
FIG. 16 is a graph of the timing error estimate as a function of the baseband timing when the carrier phase is held at an optimal point.

FIG. 15 shows the phase error response when timing is held at the optimal point. FIG. 16 shows the timing error response when the phase is held at optimum. In both figures the solid line corresponds to the signal-to-noise ratio $E_s/N_0$ of 13 dB, the dashed line to $E_s/N_0$ of 8 dB, the dotted line to $E_s/N_0$ of 5 dB and the dash-dot line to $E_s/N_0$ of 3 dB. The normal operation of the phase/timing detector 40 is preferably between 5 dB and 10 dB. The 5-dB line is used to determine the nominal detector gain, since overestimating the gain is dangerous as it leads to reduced phase margin of the phase and timing loops. Table 1 shows the phase/timing detector gains as functions of the signal to noise ratio $E_s/N_0$.

TABLE 1

| | Detector Gains. | | | |
|---|---|---|---|---|
| | Phase Gain | | Timing Gain | |
| SNR $E_s/N_0$ dB | Raw | Total | Raw | Total |
| 13 | 50 | 1.16e−8 | 17.4 | 4.5e−9 |
| 8 | 23 | 5.4e−9 | 14.3 | 3.33e−9 |
| 5 | 13 | 3.0e−9 | 10.3 | 2.4e−9 |
| 3 | 8.6 | 2.0e−9 | 6.8 | 1.6e−9 |

The phase/timing detector 40 uses the input consecutive complex values $z_{-½}$, $z_0$, $z_{1/2}$, $z_1$ to compute one phase error estimate and one timing error estimate for one modulation symbol.

In one embodiment of the invention, the complex values $z_{-½}$, $z_0$, $z_{1/2}$, $z_1$ are outputted from the multirate filter 14 of the system of FIG. 2, with real and imaginary parts given as offset sign-magnitude numbers. The offset can be ignored in the arithmetic for simplicity of the algorithm, without causing any bias results. The sign of the number is the sign bit +0 for at positive number and −0 for a negative number.

If the optional automatic gain control (AGC) circuit 15 is included in the system of FIG. 2, then the values $z_{-½}$, $z_0$, $z_{1/2}$, $z_1$ pass through the AGC circuit before reaching the phase/timing detector 40.

Figure 17:
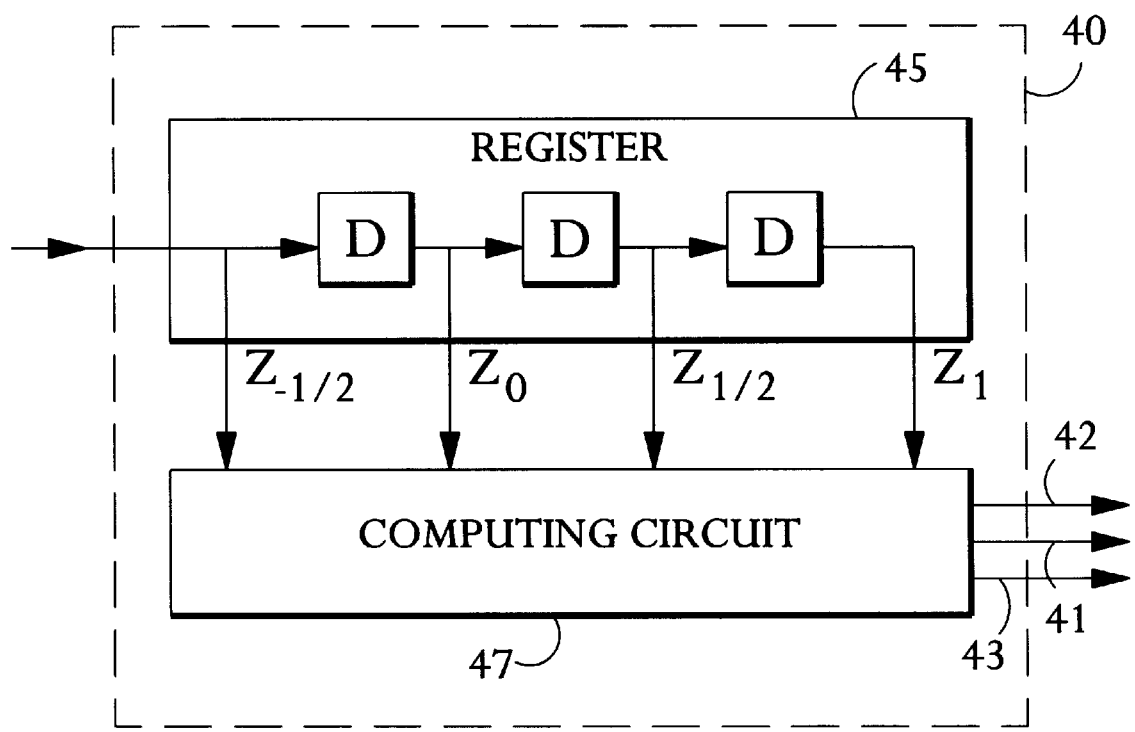
FIG. 17 is a block diagram of the disclosed phase/timing detector.

As shown in FIG. 17, the phase/timing detector 40 includes a register 45 to store the complex values $z_{-½}$, $z_0$, $z_{1/2}$, $z_1$, and a computing circuit 47 to compute the phase and timing error estimates based on these complex values.

In one embodiment of the invention, as shown in FIG. 17, the register 45 includes a delay line and the values $z_0$, $z_{1/2}$, $z_1$ are outputs of consecutive stages of the delay line. The delay line advances on either a peak or transition valid flag. The phase/timing detector takes action on these values upon receipt of a peak valid flag.

In the embodiment shown in FIG. 17, the computing circuit 47 of the phase/timing detector 40 performs the following to obtain a phase error estimate 42 for a modulation symbol:
compute raw error signals $E_0 = \Im\{z_0\}$ and $E_1 = R\{z_{1/2}\}$.
truncate $E_0$ and $E_1$ to 5 bits.
invert $E_0$ on $R\{z_0\} > 0$ and invert $E_1$ on $\Im\{z_{1/2}\} < 0$
zero $E_0$ if $$\Im\{z_{-1/2}\} \cdot \Im\{z_{1/2}\} > 0 \text{ and}$$

$$\text{zero } E_1 \text{ if } \Re\{z_0\} \cdot \Re\{z_1\} > 0$$

add the two errors and saturate the result to fit into the range [−7, 7] inclusive.

In the embodiment shown in FIG. 17, the computing circuit 47 of the phase/timing detector 40 performs the following to obtain a timing error estimate 43 for a modulation symbol:
compute raw error signals $E_0 = \Im\{z_0\}$ and $E_1 = R\{z_{1/2}\}$.
truncate $E_0$ and $E_1$ to 5 bits.
invert $E_0$ on $\Im\{z_{1/2}\} < 0$ and invert $E_1$ on $R\{z_1\} < 0$.
zero $E_0$ if $$\Im\{z_{-1/2}\} \cdot \Im\{z_{1/2}\} > 0 \text{ and}$$

$$\text{zero } E_1 \text{ if } \Re\{z_0\} \cdot \Re\{z_1\} > 0.$$

add the two errors and saturate the result to fit into the range [−7, 7] inclusive.

Thus, the computations for the phase and timing error estimates are nearly identical except for the inversion criteria.

The phase/timing detection algorithm need not be implemented in exactly this fashion. About half of the computations could be performed on the transition flag and the rest of the computations could be performed on the peak flag.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for generating an error estimate as input for an error recovery loop of a demodulator, the demodulator receiving an offset quadrature phase shift keyed (OQPSK) signal having a symbol interval, the method comprising the operations of:

(a) receiving at least four consecutive complex samples $z_{-½}$, $z_0$, $z_{1/2}$ and $z_1$, the consecutive complex samples being obtained by sampling the OQPSK signal at half the symbol interval, each of the complex samples $z_{-½}$, $z_0$, $z_{1/2}$ and $z_1$ having a real part and an imaginary part; and (b) computing the error estimate based on $z_{-½}$, $z_0$, $z_{1/2}$ and $z_1$.

2. The method of claim 1 wherein the operation of computing the error estimate comprises the operations of:

(c) computing first and second error values $E_0$ and $E_1$ based on the consecutive complex samples $z_{-½}$, $z_0$, $z_{1/2}$ and $z_1$; and (d) combining $E_0$ and $E_1$ to generate the error estimate.

3. The method of claim 2 wherein the error estimate is a phase error estimate, and wherein operation (c) comprises the operations of:

equating $E_0$ to the imaginary part of $z_0$;
    inverting $E_0$ if the real part of $z_0$ is strictly positive; and
    equating $E_0$ to zero if the imaginary part of $z_{-½}$ and the imaginary part of $z_{1/2}$ have a same sign.

4. The method of claim 2 wherein the error estimate is a phase error estimate, and wherein operation (c) comprises the operations of:

equating $E_1$ to the real part of $z_{1/2}$;

inverting $E_1$ if the imaginary part of $z_{1/2}$ is strictly negative; and equating $E_1$ to zero if the real part of $z_0$ and the real part of $z_1$ have a same sign.

5. The method of claim 2 wherein the error estimate is a timing error estimate, and wherein operation (c) comprises the operations of:

equating $E_0$ to the imaginary part of $z_0$;

inverting $E_0$ if the imaginary part of $z_{1/2}$ is strictly negative; and equating $E_0$ to zero if the imaginary part of $z_{-1/2}$ and the imaginary part of $z_{1/2}$ have a same sign.

6. The method of claim 2 wherein the error estimate is a timing error estimate, and wherein operation (c) comprises the operations of:

equating $E_1$ to the real part of $z_{1/2}$;

inverting $E_1$ if the real part of $z_1$ is strictly negative; and equating $E_1$ to zero if the real part of $z_0$ and the real part of $z_1$ have a same sign.

7. The method of claim 1 wherein the imaginary parts of $z_{-1/2}$ and $z_{-1/2}$ correspond to peak samples and the real parts of $z_{-1/2}$ and $z_{-1/2}$ correspond to transition samples, and wherein the imaginary parts of $z_0$ and $z_1$ correspond to transition samples and the real parts of $z_0$ and $z_1$ correspond to peak samples, the peak samples being obtained by sampling the OQPSK signal on time, the transition samples being obtained by sampling the OQPSK half the symbol interval off in timing.

8. The method of claim 1 further comprising the operations of:

truncating each of the first and second error values $E_0$ and $E_1$ to a predetermined number of bits; and saturating the error estimate such that the error estimate fits in a predetermined range of values.

9. A method for generating a timing error estimate and a phase error estimate to recover timing and carrier phase of an offset quadrature phase shift keyed (OQPSK) signal having a symbol interval, the method comprising the operations of:

(a) receiving at least four consecutive complex samples $z_{-1/2}$, $z_0$, $z_{1/2}$ and $z_1$, the consecutive complex samples being obtained by sampling the OQPSK signal at half the symbol interval, each of the consecutive complex samples $z_{-1/2}$, $z_0$, $z_{1/2}$ and $z_1$ having a real part and an imaginary part;

(b) equating a first error value $E_0$ to the imaginary part of $z_0$;

(c) equating a second error value $E_1$ to the real part of $z_{1/2}$;

(d) equating a first phase error to $-E_0$ if the real part of $z_0$ is strictly positive;

(e) equating a second phase error to $-E_1$ if the imaginary part of $z_{1/2}$ is strictly negative;

(f) equating a first timing error to $-E_0$ if the imaginary part of $z_{1/2}$ is strictly negative;

(g) equating a second timing error to $-E_1$ if the real part of $z_1$ is strictly negative;

(h) equating each of the first phase error and the first timing error to zero if the imaginary part of $z_{-1/2}$ and the imaginary part of $z_{1/2}$ have a same sign;

(i) equating each of the second phase error and the second timing error to zero if the real part of $z_0$ and the real part of $z_1$ have a same sign;

(j) combining the first and second phase errors to form the phase error estimate, the phase error estimate being inputted to a phase recovery loop; and (k) combining the first and second timing errors to form the timing error estimate, the timing error estimate being inputted to a timing recovery loop.

10. The method of claim 9 wherein the imaginary parts of $z_{-1/2}$ and $z_{-1/2}$ correspond to peak samples and the real parts of $z_{-1/2}$ and $z_{-1/2}$ correspond to transition samples, and wherein the imaginary parts of $z_0$ and $z_1$ correspond to transition samples and the real parts of $z_0$ and $z_1$ correspond to peak samples, the peak samples being obtained by sampling the OQPSK signal on time, the transition samples being obtained by sampling the OQPSK half the symbol interval off in timing.

11. The method of claim 9 further comprising:

truncating each of the first and second error signals $E_0$ and $E_1$ to a predetermined number of bits; and saturating each of the phase and timing error estimates such that each of the phase and timing error estimates fits in a predetermined range of values.

12. The method of claim 9 wherein the phase error estimate and the timing error estimate are interrelated.

13. A detector for generating an error estimate as input for an error recovery loop of a demodulator, the demodulator receiving an offset quadrature phase shift keyed (OQPSK) signal having a symbol interval, the detector comprising:

(a) a register receiving at least four consecutive complex samples $z_{-1/2}$, $z_0$, $z_{1/2}$ and $z_1$, the consecutive complex samples being obtained by sampling the OQPSK signal at half the symbol interval, each of the consecutive complex samples $z_{-1/2}$, $z_0$, $z_{1/2}$ and $z_1$ having a real part and an imaginary part; and (b) a computing circuit coupled to the register to receive the consecutive complex samples, the computing circuit computing the error estimate based on the consecutive complex samples $z_{-1/2}$, $z_0$, $z_{1/2}$ and $z_1$.

14. The detector of claim 13 wherein the computing circuit computes first and second error values $E_0$ and $E_1$ based on the consecutive complex samples $z_{-1/2}$, $z_0$, $z_{1/2}$ and $z_1$ and combines $E_0$ and $E_1$ to generate the error estimate.

15. The detector of claim 14 wherein the computing circuit computes a phase error estimate as the error estimate by equating $E_0$ to the imaginary part of $z_0$ and $E_1$ to the real part of $z_{1/2}$, inverting $E_0$ if the real part of $z_0$ is strictly positive, inverting $E_1$ if the imaginary part of $z_{1/2}$ is strictly negative, equating $E_0$ to zero if the imaginary part of $z_{-1/2}$ and the imaginary part of $z_{1/2}$ have a same sign, and equating $E_1$ to zero if the real part of $z_0$ and the real part of $z_1$ have a same sign.

16. The detector of claim 14 wherein the computing circuit computes a timing error estimate as the error estimate by equating $E_0$ to the imaginary part of $z_0$ and $E_1$ to the real part of $z_{1/2}$, inverting $E_0$ if the imaginary part of $z_{1/2}$ is strictly negative, inverting $E_1$ if the real part of $z_1$ is strictly negative, equating $E_0$ to zero if the imaginary part of $z_{-1/2}$ and the imaginary part of $z_{1/2}$ have a same sign, and equating $E_1$ to zero if the real part of $z_0$ and the real part of $z_1$ have a same sign.

17. The detector of claim 13 wherein the register includes a flag register, the flag register producing a peak flag or a transition flag.

18. A system for recovering timing and carrier phase of an offset quadrature phase shift keyed (OQPSK) signal, the OQPSK signal including modulation symbols and having a symbol interval, the system comprising:

(a) an analog-to-digital (A/D) converter, the A/D converter receiving the OQPSK signal and generating first samples of the OQPSK signal;

(b) a phase rotator coupled to the A/D converter to receive the first samples of the OQPSK signal, the phase rotator generating in-phase and quadrature signals;

(c) a multi-rate filter coupled to the phase rotator to receive the in-phase and quadrature signals, the multi-rate filter generating second samples corresponding to modulation symbols;

(d) a detector coupled to the multi-rate filter to receive the second samples, the detector generating a phase error estimate, a timing error estimate and a demodulated symbol;

(e) a first loop filter coupled to the detector to receive the phase error estimate, the first loop filter filtering the phase error estimate and producing a filtered phase error estimate;

(f) a first numerically controlled oscillator (NCO) coupled to the first loop filter and to the phase rotator, the first NCO receiving the filtered phase error estimate and outputting a phase error control signal to the phase rotator;

(g) a second loop filter coupled to the detector to receive the timing error estimate, the second loop filter filtering the timing error estimate and producing a filtered timing error estimate; and (h) a second numerically controlled oscillator (NCO) coupled to the second loop filter and to the multi-rate filter, the second NCO receiving the filtered timing error estimate and producing a timing error control signal to the multi-rate filter.

19. The system of claim 18 further comprising a phase lock detector coupled to the detector, the phase lock detector producing a first signal indicative of a phase lock.

20. The system of claim 18 further comprising a timing lock detector coupled to the detector, the timing lock detector producing a second signal indicative of a timing lock.

21. The system of claim 18 further comprising an automatic gain control (AGC) circuit coupled to the multirate filter and to the detector.

22. The system of claim 18 wherein the second samples correspond to complex samples obtained by sampling each of the in-phase and quadrature signals at half the symbol interval, and wherein the detector comprises:

(a) a register receiving at least four consecutive second samples $z_{-1/2}$, $z_0$, $z_{1/2}$ and $z_1$, each of the consecutive second samples $z_{-1/2}$, $z_0$, $z_{1/2}$ and $z_1$ having a real part and an imaginary part; and (b) a computing circuit coupled to the register to receive the consecutive second samples $z_{-1/2}$, $z_0$, $z_{1/2}$ and $z_1$, the computing circuit computing the phase error estimate and the timing error estimate based on the consecutive second samples $z_{-1/2}$, $z_0$, $z_{1/2}$ and $z_1$.

23. A method for generating a phase error estimate and a timing error estimate as inputs for phase and timing error recovery loops, respectively, of a demodulator, the demodulator receiving an offset quadrature phase shift keyed (OQPSK) signal having a symbol interval, the method comprising the operation of:

(a) receiving at least four consecutive complex samples $z_{-1/2}$, $z_0$, $z_{1/2}$ and $z_1$, the consecutive complex samples being obtained by sampling the OQPSK signal at half the symbol interval, each of the complex samples $z_{-1/2}$, $z_0$, $z_{1/2}$ and $z_1$ having a real part and an imaginary part; and (b) computing the phase error estimate and the timing error estimate based on $z_{-1/2}$, $z_0$, $z_{1/2}$ and $z_1$.

24. The method of claim 23 wherein operation (b) comprises the operations of:

(c) computing first and second error values $E_0$ and $E_1$ based on the consecutive complex samples $z_{-1/2}$, $z_0$, $z_{1/2}$ and $z_1$;

(d) combining $E_0$ and $E_1$ according to a sign of the real part of $z_0$ and a sign of the imaginary part of $z_{1/2}$ to generate the phase error estimate; and (e) combining $E_0$ and $E_1$ according to a sign of the imaginary part of $z_{1/2}$ and a sign of the real part of $z_1$ to generate the timing error estimate.

25. The method of claim 24 wherein operation (c) comprises the operations of:

equating $E_0$ to the imaginary part of $z_0$;

equating $E_0$ to zero if the imaginary part of $z_{-1/2}$ and the imaginary part of $z_{1/2}$ have a same sign;

equating $E_1$ to the real part of $z_{1/2}$; and equating $E_1$ to zero if the real part of $z_0$ and the real part of $z_1$ have a same sign.

26. The method of claim 24 wherein operation (d) comprises the operations of:

inverting $E_0$ if the real part of $z_0$ is strictly positive;

inverting $E_1$ if the imaginary part of $z_{1/2}$ is strictly negative; and summing $E_0$ and $E_1$.

27. The method of claim 24 wherein operation (e) comprises the operations of:

inverting $E_0$ if the imaginary part of $z_{1/2}$ is strictly negative;

inverting $E_1$ if the real part of $z_1$ is strictly negative; and summing $E_0$ and $E_1$.

28. A detector for generating a phase error estimate and a timing error estimate as inputs for phase and timing error recovery loops, respectively, of a demodulator, the demodulator receiving an offset quadrature phase shift keyed (OQPSK) signal having a symbol interval, the detector comprising:

(a) a register receiving at least four consecutive complex samples $z_{-1/2}$, $z_0$, $z_{1/2}$ and $z_1$, the consecutive complex samples being obtained by sampling the OQPSK signal at half the symbol interval, each of the consecutive complex samples $z_{-1/2}$, $z_0$, $z_{1/2}$ and $z_1$ having a real part and an imaginary part; and (b) a computing circuit coupled to the register to receive the consecutive complex samples, the computing circuit computing the phase and timing error estimates based on the consecutive complex samples $z_{-1/2}$, $z_0$, $z_{1/2}$ and $z_1$.

29. The detector of claim 28 wherein the computing circuit performs the following:

(1) computing first and second error values $E_0$ and $E_1$ based on the consecutive complex samples $z_{-1/2}$, $z_0$, $z_{1/2}$ and $z_1$;

(2) combining $E_0$ and $E_1$ according to a sign of the real part of $z_0$ and a sign of the imaginary part of $z_{1/2}$ to generate the phase error estimate; and (3) combining $E_0$ and $E_1$ according to a sign of the imaginary part of $z_{1/2}$ and a sign of the real part of $z_1$ to generate the timing error estimate.

30. The detector of claim 29 wherein the computing circuit computes $E_0$ and $E_1$ based on the consecutive complex samples $z_{-1/2}$, $z_0$, $z_{1/2}$ and $z_1$ by:

equating $E_0$ to the imaginary part of $z_0$;

equating $E_0$ to zero if the imaginary part of $z_{-1/2}$ and the imaginary part of $z_{1/2}$ have a same sign;

equating $E_1$ to the real part of $z_{1/2}$; and equating $E_1$ to zero if the real part of $z_0$ and the real part of $z_1$ have a same sign.

31. The detector of claim 29 wherein the computing circuit combines $E_0$ and $E_1$ to generate the phase error estimate by:

inverting $E_0$ if the real part of $z_0$ is strictly positive;

inverting $E_1$ if the imaginary part of $z_{1/2}$ is strictly negative; and summing $E_0$ and $E_1$.

32. The detector of claim 29 wherein the computing circuit combines $E_0$ and $E_1$ to generate the timing error estimate by:

inverting $E_0$ if the imaginary part of $z_{1/2}$ is strictly negative;

inverting $E_1$ if the real part of $z_1$ is strictly negative; and summing $E_0$ and $E_1$.

* * * * *